(12) United States Patent
Zhang et al.

(10) Patent No.: US 11,430,134 B2
(45) Date of Patent: Aug. 30, 2022

(54) HARDWARE-BASED OPTICAL FLOW ACCELERATION

(71) Applicant: NVIDIA Corporation, Santa Clara, CA (US)

(72) Inventors: Dong (Megamus) Zhang, Shanghai (CN); JinYue (Gser) Lu, Shanghai (CN); Zejun (Harry) Hu, Shanghai (CN)

(73) Assignee: NVIDIA CORPORATION, Santa Clara, CA (US)

( * ) Notice: Subject to any disclaimer, the term of this patent is extended or adjusted under 35 U.S.C. 154(b) by 14 days.

(21) Appl. No.: 16/558,788

(22) Filed: Sep. 3, 2019

(65) Prior Publication Data
US 2021/0065379 A1    Mar. 4, 2021

(51) Int. Cl.
| | | |
|---|---|---|
| G06T 7/207 | (2017.01) | |
| G06T 7/215 | (2017.01) | |
| G06V 10/75 | (2022.01) | |
| G06V 10/25 | (2022.01) | |
| G06F 9/38 | (2018.01) | |
| G06T 5/00 | (2006.01) | |

(52) U.S. Cl.
CPC ............ *G06T 7/207* (2017.01); *G06F 9/3877* (2013.01); *G06T 5/002* (2013.01); *G06T 7/215* (2017.01); *G06V 10/25* (2022.01); *G06V 10/751* (2022.01)

(58) Field of Classification Search
CPC ........... G06T 7/593; G06T 2207/20228; G06T 7/215; G06T 7/207; G06T 5/002; G06V 10/751; G06V 10/25; G06F 9/3877
See application file for complete search history.

(56) References Cited

U.S. PATENT DOCUMENTS

| | | | | |
|---|---|---|---|---|
| 5,557,684 A | * | 9/1996 | Wang | ........................ G06K 9/38 348/E5.066 |
| 2013/0083994 A1 | * | 4/2013 | Ren | ........................ G06T 7/97 382/154 |
| 2014/0079333 A1 | * | 3/2014 | Hirai | ........................ G06T 5/007 382/255 |

(Continued)

OTHER PUBLICATIONS

Behl et al., "Bounding Boxes, Segmentations and Object Coordinates: How Important is Recognition for 3D Scene Flow Estimation in Autonomous Driving Scenarios?", (2017) 2593-2602,. 10.1109/ICCV.2017.281. 10 pages.

(Continued)

*Primary Examiner* — Kenny A Cese
(74) *Attorney, Agent, or Firm* — Nixon & Vanderhye, PC

(57) ABSTRACT

An optical flow accelerator (OFA) which provides hardware-based acceleration of optical flow and stereo disparity determination is described. A system is described which includes an OFA configured to determine a first optical flow using a first disparity search technique, and to determine a second optical flow using a second disparity search technique that is different from the first disparity search technique. The system also includes a processor configured to combine the first optical flow and the second optical flow to generate a third optical flow. In some implementations, the first and second disparity search techniques are based upon Semi-Global Matching (SGM). In some implementations, the OFA is further configurable to determine stereo disparity.

24 Claims, 23 Drawing Sheets

(56) References Cited

U.S. PATENT DOCUMENTS

| | | | | |
|---|---|---|---|---|
| 2014/0294289 A1* | 10/2014 | Nakatani | .............. | H04N 13/106 |
| | | | | 382/154 |
| 2015/0262380 A1* | 9/2015 | Grasmug | .................. | G06T 3/40 |
| | | | | 382/107 |
| 2017/0161565 A1* | 6/2017 | Garud | ................ | G06K 9/00791 |
| 2017/0171475 A1* | 6/2017 | Shibata | ................ | H04N 5/2328 |
| 2017/0178353 A1* | 6/2017 | Smirnov | ................. | G06T 7/593 |
| 2018/0293454 A1* | 10/2018 | Xu | ........................ | G06K 9/4628 |
| 2019/0012798 A1* | 1/2019 | Amano | ................. | B60W 30/08 |
| 2019/0213746 A1* | 7/2019 | Azuma | .................. | G01B 11/00 |
| 2019/0318494 A1* | 10/2019 | Tsai | ........................ | G06T 7/174 |
| 2020/0074642 A1* | 3/2020 | Wilson | .................... | G06T 7/269 |

OTHER PUBLICATIONS

Gehrig et al., "A Real-Time Low-Power Stereo Vision Engine Using Emi-Global Matching", ICVS 2009,LNCS 5815, pp. 134-143, 2009.

Hirschmuller, "Stereo Processing by Semiglobal Matching and Mutual Information", IEEE Transactions on Pattern Analysis and Machine Intelligence, vol. 30, No. 2, Feb. 2008, pp. 328-341.

Seki et al., "SGM-Nets: Semi-global Matching with Neural Networks", (2017) 6640-6649. 10.1109/CVPR.2017.703. pp. 231-240.

Wulff et al., "Optical Flow in Mostly Rigid Scenes", arXiv:1705.01352v1 [cs.CV] May 3, 2017, 15 pages.

Yamaguchi et al., "Robust Monocular Epipolar Flow Estimation", 2013 IEEE Conference on Computer Vision and Pattern Recognition, Portland, OR, 2013, pp. 1862-1869 8 pages.

* cited by examiner

HARDWARE-BASED OPTICAL FLOW ACCELERATION

TECHNICAL FIELD

This disclosure relates generally to techniques for detecting motion and identifying objects in a scene based on a sequence of images, and more particularly to optical flow and stereo disparity in graphics processing, and even more particularly to hardware-based acceleration of optical flow and stereo disparity determination.

BACKGROUND

Optical flow is a fundamental technique in computer vision. The term "optical flow" refers to the motion in a scene represented in an image. The motion is due to the relative motion of objects in the scene and the camera that captures the image of that scene. The relative motion may be the result of camera movement, object movement or movement of both the object and camera. Optical flow is also described as the distribution of apparent velocities of movement of brightness patterns in an image. More concretely, optical flow can be considered as the estimate of two dimensional (2D) displacement of pixels between two image frames captured at different times. Optical flow calculation techniques can calculate the motion between two image frames taken at times t and t+δ at every pixel position.

Optical flow, however, does not include depth information. Thus, given two pairs of stereo images captured at consecutive time intervals t and t+δ, estimation of the three-dimensional (3D) scene requires the estimation stereo disparity in each pair of stereo images, in addition to the optical flow. Stereo disparity estimates the shift in individual pixels between the left and right stereo images.

The optical flow and stereo disparity of a scene yields information regarding spatial relationships and rates of change associated with objects in the scene. Discontinuities in the optical flow can be used to identify objects in the scene by, for example, segmenting areas in the image that depict respective objects. The optical flow field and/or stereo disparity can be used to determine three dimensional structures in the scene and/or to determine the motion of objects and the camera relative to the scene.

Fast and efficient calculation of optical flow and stereo disparity is important for many real-time applications such as autonomous driving, etc. The optical flow of a scene, determined based on a sequence of video frames, can be used in image processing and control of navigation including motion detection, object segmentation, time-to-contact information, focus of expansion calculations, luminance, motion compensated encoding, and stereo disparity measurement. Some automotive applications (e.g. advanced driver assistance systems (ADAS), autonomous driving systems, etc.) require real-time optical flow computation for object detection and/or tracking for autonomous navigation and the like. Similar applications may be also made for robots, aircraft, water-based vehicles and other moving objects. Object identification and the like from video frames can also benefit from optical flow in order to provide clearer video frames to deep learning techniques for video inferencing and the like. Other uses for the output of optical flow techniques include video frame stitching in virtual reality applications, video frame rate upconversion in gaming applications, etc.

Until a few years ago, tasks such as recognizing and tracking an object or classifying an action in video streams were out of reach for computers due to the computational complexity involved, particularly with the computational complexity of calculating optical flow. With the advent of deep neural networks (DNNs) and massive acceleration made possible by graphics processing units (GPU), many of these tasks can now be performed by computers with high accuracy. Two primary methods exist to track objects within a video feed: detect in every frame—identify the bounding box for the object(s) of interest in each frame using object classification and track the object boundaries from frame to frame; and detect and track—identify the bounding box for the object in the first frame (or every nth frame) and calculate the motion of the pixels (or blocks) belonging to the object in the subsequent frames for tracking. The first method has very high accuracy but is computationally complex since object classification (inference) needs to be run on each frame. The second method requires less computation but relies on accurate estimates of the motion/flow vectors of pixels (or blocks) between successive frames.

Despite the improvements in processor speeds, entirely software-based optical flow is often found to be inadequate for real-time applications. NVIDIA's Turing™ GPUs introduced a hardware functionality for computing optical flow between images with very high performance. See "An Introduction to the NVIDIA Optical Flow SDK at https://devblogs.nvidia.com/an-introduction-to-the-nvidia-optical-flow-sdk/ (accessed Jul. 15, 2019).

However, as the applications of optical flow grow and accuracy/performance demands become more stringent, a dedicated hardware unit may be desired for at least some real-time applications. For example, the quality of optical flow and stereo is vital to ADAS and autonomous driving applications as they are safety critical. Optical flow is also one of the key aspects to improve user experience of virtual reality (VR)/gaming applications. Other use-cases for optical flow such as stereo depth estimation, video frame interpolation and video frame extrapolation can also benefit from even more improved and more efficient optical flow.

SUMMARY

An example embodiment provides a system comprising optical flow acceleration circuitry and at least one processor. The optical flow acceleration circuitry is configured to: determine a first optical flow associated with input images, the first optical flow being determined using a first disparity search technique; and determine a second optical flow associated with the input images, the second optical flow being determined using a second disparity search technique that is different from the first disparity search technique. The at least one processor is configured to combine the first optical flow and the second optical flow to generate a third optical flow associated with the input images.

An example embodiment provides a method of accelerated optical flow generation. The method includes a step of determining a first optical flow associated with input images, the first optical flow being determined using a first disparity search. The method also includes a step of determining a second optical flow associated with the input images, the second optical flow being determined using a second disparity search that is different from the first disparity search; and a step of combining the first optical flow and the second optical flow to generate a third optical flow associated with the input images.

An example embodiment provides an optical flow accelerator which comprises a first circuitry and second circuitry, wherein the first circuitry and the second circuitry share common circuitry for performing a core regularizing technique for pixel matching costs. The first circuitry is configured for determining a first optical flow associated with first and second input frames, the first optical flow being determined using a first disparity search; and the second circuitry is configured for determining a second optical flow associated with the input frames, the second optical flow being determined using a second disparity search that is different from the first disparity search.

DETAILED DESCRIPTION

Figure 1:
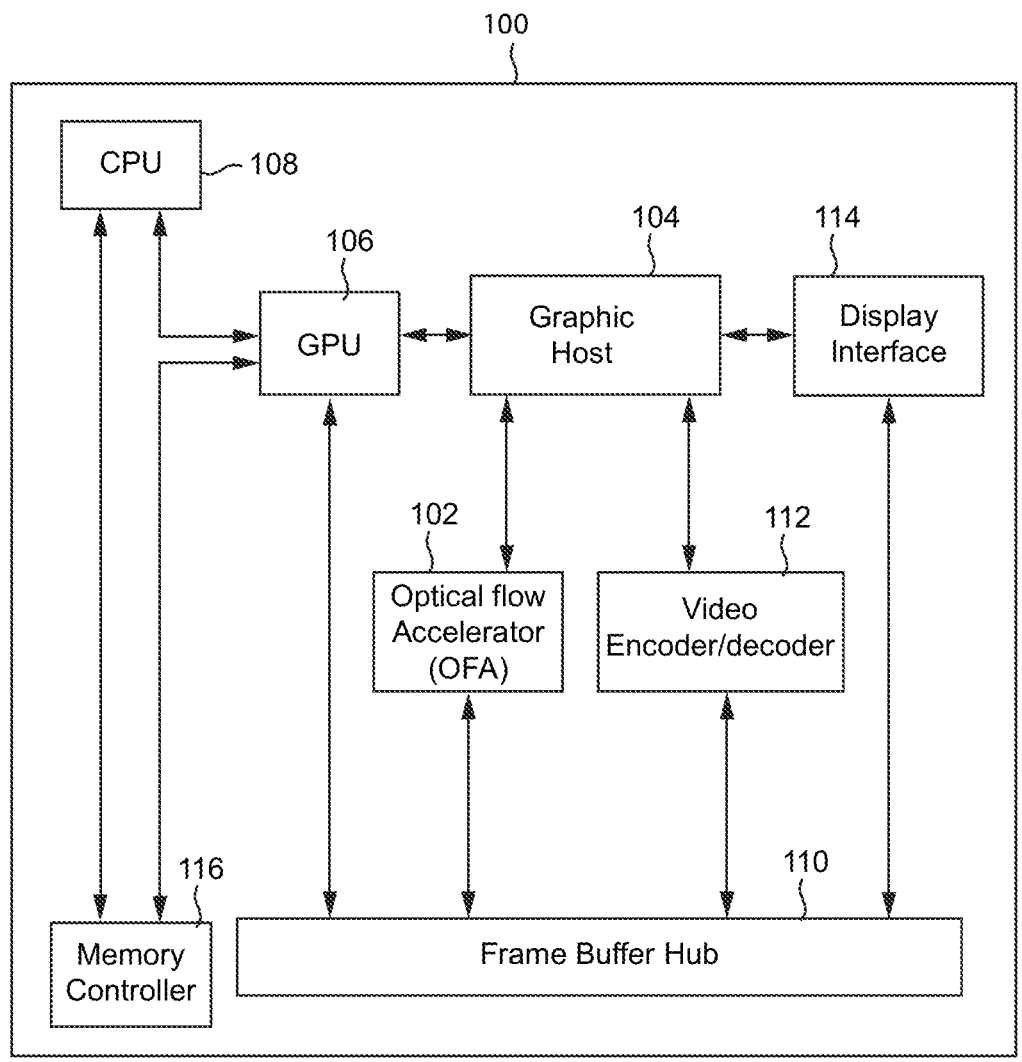
FIG. 1 schematically illustrates a system that includes a hardware optical flow accelerator (OFA), according to some example embodiments.

Certain example embodiments of the present invention provide for hardware-based acceleration of optical flow determination. The acceleration is provided by a hardware unit that, in some embodiments, is dedicated to optical flow. The hardware unit is referred to herein as the "Optical Flow Accelerator" (OFA). The OFA may also provide acceleration of stereo disparity determination. When configured to provide both acceleration of optical flow determination and acceleration of stereo disparity determination, a system incorporating the OFA may process input video streams by, based on respective pairs of stereo images captured at consecutive time intervals t and t+δ, accelerate the estimation of the 3D scene for real-time use in numerous applications.

The OFA is designed for applications that require high quality as well as high performance optical flow and stereo disparity. Although in some existing systems certain hardware components are enhanced with support for aspects of optical flow and stereo disparity features, as described in the background section, existing systems appear to be inadequate to satisfy the high quality and speed demands of certain more recent applications which are becoming popular. Real-time safety-critical applications such as fully autonomous driving/navigation and ADAS (e.g. which involves as object/pedestrian detection/tracking, structure from motion (SFM) determination, simultaneous localization and mapping (SLAM), etc.) can be substantially improved by using the OFA to generate the optical flow and a smooth dense disparity map that facilitates accurate 3D reconstruction of a scene. The optical flow, disparities and, optionally, other associated information that is output by the OFA for a scene can be used by the autonomous navigation or ADAS application to detect objects and other characteristics of the scene more quickly and accurately than has been previously possible with conventional systems. The improved accuracy and speed can yield improved navigation control and safety of the vehicle as well as an improved experience for the vehicle's driver. Even other applications that may not be as safety critical, but that have substantial real-time requirements (e.g. 360 video stitching etc. for virtual reality, frame-rate up-conversion for gaming etc., and video classification etc. for deep learning), can be significantly facilitated by the use of the OFA.

In many applications, including such as those noted above, the OFA may form a part of the early stages processing and may operate on input images with or without preprocessing by a graphics processing unit (GPU) or other processor. For example, the OFA may take images of a scene as input and generate the corresponding optical flow and disparity map for use in later stages of the applications. The high quality optical flow and disparity map as provided by the OFA in real-time may enable true optical flow at 100% density and facilitates even more demanding applications such as efficient real-time 6D vision analysis.

The OFA, according to some embodiments, is a hardware engine that can be configured for both stereo disparity and optical flow estimation. It provides a unified architecture that uses "Semi Global Matching" (SGM) as the core regularizer for matching cost determinations. In some embodiments, the OFA may support one-dimensional (1D)/two-dimensional (2D) cost matching, and 1D/2D SGM for stereo, epipolar SGM optical flow and pyramidal SGM optical flow estimation.

Several existing SGM-based solutions use SGM for stereo disparity estimation. The OFA, in contrast, is configured to use SGM for both epipolar SGM optical flow acceleration and pyramidal SGM optical flow acceleration. In order to achieve a high level of flexibility and adaptability, the OFA in some embodiments supports four modes: epipolar SGM optical flow, pyramidal SGM optical flow, fusion optical flow, and SGM stereo. The epipolar SGM optical flow mode is based on single view geometry and is used for estimating the motion of stationary objects. The pyramidal SGM optical flow mode is a generic optical flow technique. The fusion optical flow mode is a combination of epipolar and pyramidal SGM optical flow modes with a further step of fusing the results from epipolar and pyramidal processing pipelines. The SGM stereo mode may be based on a standard SGM based algorithm. In some embodiments, the OFA also uses hardware for monocular camera egomotion (e.g. the 3D motion of camera within an environment) estimation acceleration. Moreover, the OFA provides the flexibility of selectively biasing to either quality or performance. The OFA's capabilities with respect to multiple uses of SGM is particularly useful since both optical flow and stereo are important for autonomous driving applications as well as other applications like video classification/frame rate upconversion, etc.

The OFA is expected to improve upon certain aspects of existing implementations of accelerated optical flow, such as that implemented in the Xavier and Turing processors from NVIDIA. For example, the OFA, by virtue of its hardware-accelerated SGM implementation, uses a non-local optimization in contrast to the local methods, which can yield errors when matching at flat/texture-less areas, used by the implementations in Xavier and Turing processors. The OFA is designed to also overcome limitations such as bandwidth and/or computation limitations preventing full high definition resolution, motion vector and/or disparity granularity being limited to 4×4 block, subpixel precision being limited to quarter precision, and being solely or primarily optimized for performance without sufficient scalability between performance and quality.

Hardware Optical Flow Acceleration Enabled System

FIG. 1 schematically illustrates a system that includes a hardware optical flow accelerator, according to some example embodiments. The illustrated system 100 is a system on a chip (SoC) that includes a specialized optical flow acceleration circuitry in the form of an OFA. The SoC 100 may be used in various implementations such as, for example, automotive application including for object/pedestrian detection/tracking, SFM, SLAM, etc.; virtual reality applications such as for 360 degree video stitching, etc.; gaming applications such as frame rate upconversion, etc.; deep learning applications such as video classification, etc., or other applications that uses optical flow and/or stereo disparity.

The system 100 includes an OFA 102 that is at least configured to generate an optical flow map and/or stereo disparity map from input images and related input information. The OFA 102 can be configured to operate in any of, or any combination of, a static world optical flow mode, a general optical flow mode, a stereo mode, or a fusion optical flow mode in which optical flow/disparity maps generated for static world optical flow and for general optical flow are combined. The particular mode of operation of the OFA 102 can either be selected at initialization of system 100 or dynamically in accordance with processing requirements. As noted above and further noted below in relation to FIGS. 2 and 4, the OFA 102 implements SGM as the core regularizer in its optical flow and stereo disparity determinations.

A GPU 106 may be connected to the OFA 102 directly and/or indirectly through a graphics host 104. The graphics host 104 provides a programming and control interface to various graphic and video engines, and to the display interface(s). The graphics host 104 can also have interfaces (not shown in FIG. 1) to a switch (e.g., a crossbar switch or the like) to connect with other components and a direct memory interface to fetch command and/or command structures from system memory. In some embodiments, commands and/or command structures are either gathered from a push buffer in memory or provided directly by the central processing unit (CPU) 108, and then supplied to clients that are also connected to the graphics host, such as, for example, the OFA 102. An audio/video frame encoder/decoder 112 too is connected through the graphics host 104. The audio/video frame encoder/decoder 112 may support playback and/or generation of full motion high resolution (e.g. 1440p high definition) video in any format such as, for example, H.264 BP/MP/HP/MMC, VC-1, VP8, MPEG-2, MPEG-4 and multiple audio standards.

The OFA 102 may obtain its input images and may write its output images to a memory (not shown in FIG. 1) such as a frame buffer memory that is accessed through a frame buffer interface 110. Many components in system 100, including, for example, GPU 106, OFA 102, video encoder/decoder 112, and display interface 114 may connect to the frame buffer interface 110 to access the framebuffer.

The CPU 108 controls the processing on system 100, and may be connected to the GPU 106. The CPU 108 and GPU 106 may be connected to a memory controller 116 to access an external memory.

In an example embodiment, when system 100 is incorporated, for example, in an automotive application, incoming video from one or more cameras attached to the automobile (or other vehicle) may be received by the video encoder/decoder 112 which decodes the video and writes the video frames to the framebuffer (not shown) through frame buffer interface 110. The video frames are then obtained from the framebuffer by the OFA 102 to generate the optical flow and/or stereo disparity, which is provided to the GPU 106 through the framebuffer. The GPU 106 may use the generated optical flow for further processing in any application, such as, but not limited to, object detection and/or tracking, and/or deep learning.

Figure 2:
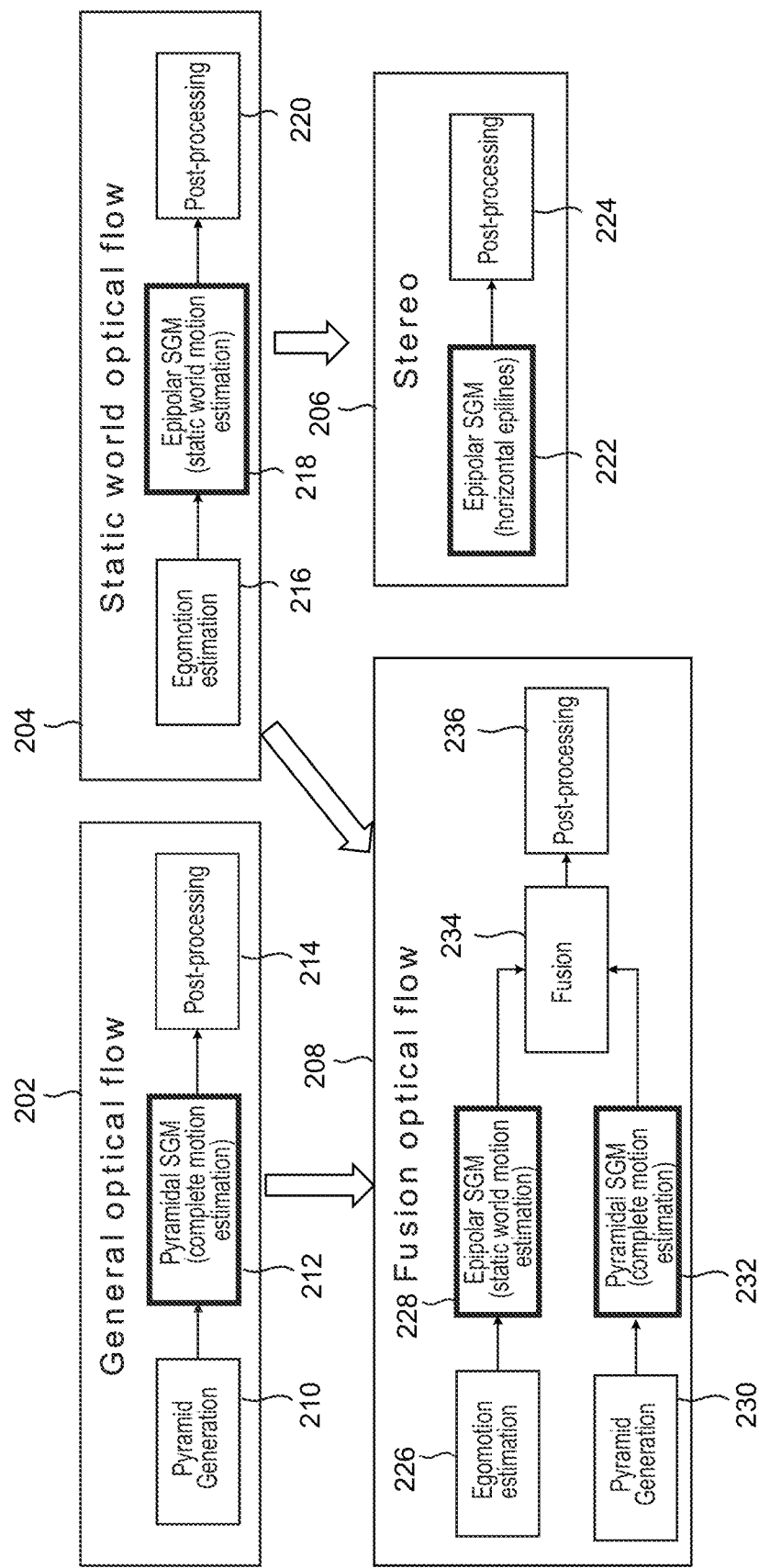
FIG. 2 illustrates a high level logical view of the optical flow acceleration functions provided by a system such as that shown in FIG. 1, according to some embodiments.

FIG. 2 illustrates a high level logical view of the optical flow and stereo disparity acceleration functions provided by a system such as system 100 shown in FIG. 1, according to some embodiments.

The optical flow functionality of system 100 includes several operation modes: a general optical flow generation 202, a static world optical flow generation 204, a stereo disparity generation 206 and a fusion optical flow generation 208 which combines general and static world optical flows to generate a combined optical flow/stereo disparity. In the illustrated embodiments, the SGM algorithm is used as the core regularizer, for smoothing of matching costs, to determine the optical flow in each mode of optical flow and/or stereo disparity.

The general optical flow 202 comprises a pyramid generation stage 210, a complete motion estimation stage 212, and a general optical flow post processing stage 214. The complete motion estimation stage 212 uses an SGM technique adapted to utilize one or more layers of the image pyramid generated at stage 210. The adapted SGM technique used in stage 212 may be referred to as "pyramidal SGM" due to the pyramidal processing of the input images. In some embodiments, stages 210 and 214 are performed in software whereas the stage 212 is performed in hardware such as the OFA 102. The instruction execution required by stages 210 and 214 may be performed by GPU 106 and/or graphics host 104. An example of the general optical flow processing according to some embodiments is described in relation to FIG. 11 below.

The static world optical flow 204 comprises a egomotion estimation stage 216, a static world motion estimation stage 218, and a static world optical flow post processing stage 220. As also noted above, term "egomotion" refers to the 3D motion of the camera in the environment. In some embodiments, the egomotion is determined by estimating the motion of the camera in relation to the rigid scene based on a sequence of images captured by the camera. The static world motion estimation stage 218 uses an SGM technique adapted for two-dimensional epipolar motion. The adapted SGM technique used in stage 218 may be referred to as "epipolar SGM". Stages 216 and 220 may be performed by software whereas stage 218 may be performed in hardware such as the OFA 102. The instruction execution required by stages 216 and 220 may be performed by GPU 106 and/or graphics host 104. An example of the static world optical flow processing according to some embodiments is described in relation to FIGS. 9-10 below.

The stereo disparity 206 comprises a horizontal motion estimation stage 222 and a stereo disparity post processing stage 224. Stage 222 can be configured to use the epipolar SGM technique to determine horizontal motion, and is performed in hardware such as the OFA 102. The stage 224 may be performed in software. The instruction execution required by stage 224 may be performed by GPU 106 and/or graphics host 104. An example of the stereo disparity processing according to some embodiments is described in relation to FIG. 12 below.

The fusion optical flow 208 comprises an egomotion estimation stage 226, a static world motion estimation stage 228, a pyramid generation stage 230, a complete motion estimation stage 232, a fusion stage 234 and a fusion optical flow post processing stage 236. Stages 226, 228, 230 and 232 may be identical to stages 210, 212, 216 and 218, respectively.

The fusion stage 234 receives the optical flow from the static world motion estimation stage 228 and the complete motion estimation stage 232 and combines them into a fused optical flow in which the background is determined by the static world motion estimation (e.g. using epipolar SGM) and the foreground (including moving objects) is determined by complete motion estimation (e.g. using pyramidal SGM).

The fusion may be based on fusing the generated optical flow maps using the corresponding disparities/cost map. In some embodiments, a technique such as cost-based winner takes all (WTA) or cost-based segmentation may be used for the fusion. The output of the fusion stage 234 may include an optical flow in which the foreground is based on pyramidal SGM and the background is based on epipolar SGM, and the corresponding segmentation map. The flow maps that are input to the fusion stage may be generated in some embodiments by sequentially performing the static world optical flow and the general optical flow. In some embodiments, however, the input flow maps may be generated by concurrently performing the static world optical flow and the general optical flow. The fusion stage 234 and the fusion optical flow post-processing stage 236 may be performed in software, for example, by the GPU and/or the graphics host. An example of the fusion optical flow processing according to some embodiments is described in relation to FIG. 13 below.

Figure 3A:
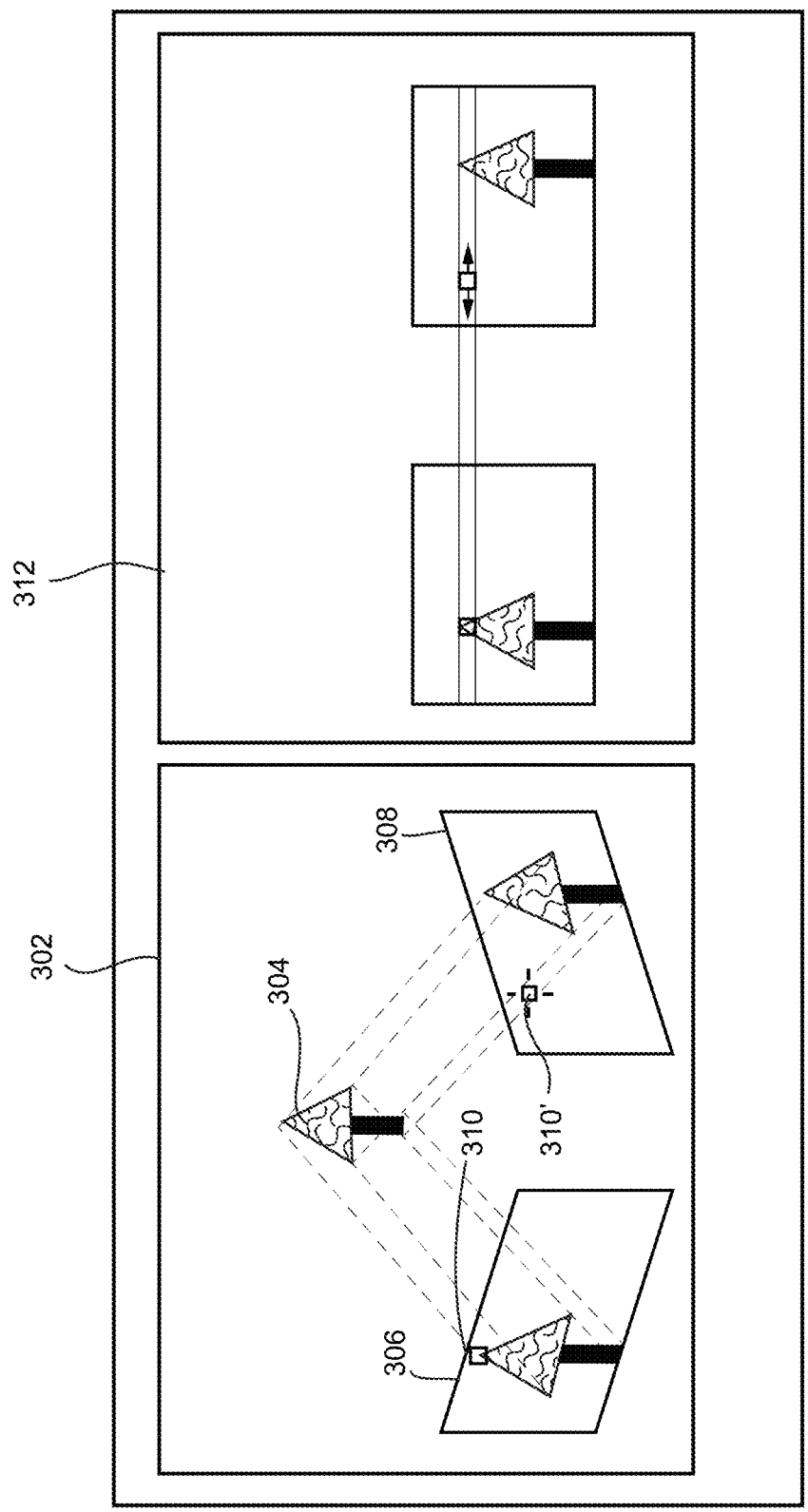
FIG. 3A shows an example of disparity in stereo images captured of the same scene.

FIG. 3A shows an example of the disparity in stereo images captured of the same scene. Illustration 302 shows an object 304 in a scene as captured by a left camera (in a left image 306) and a right camera (a right image 308). Illustration 312 shows the disparity between the left and right images. For example, pixel 310 shown in the left image is the top of the object 304 as captured in the left image, but the image of object 304 in the right image is shifted to the right of the x, y coordinates of pixel 310. The corresponding x,y position 310' in the right image has a different content than the x,y position 310 in the left image. A stereo disparity map represents, for each pixel in a left image (e.g., base image), the observed shift (disparity) of the pixels in the right image (reference image) or vice versa. Since the apparent shift in a pixel between left and right stereo images is inversely proportional to the depth of the location or object represented in the pixel. A "disparity map" represents disparities between images, stereo or otherwise. In some instances, the disparity map encodes the disparity of each pixel in a gray (or color) value. For example, the example encoding of disparities may result in a disparity map having darker gray shades for small disparities and lighter grays for larger disparities. The disparity map contains sufficient information for generating a 3D model of the scene.

Figure 3B:
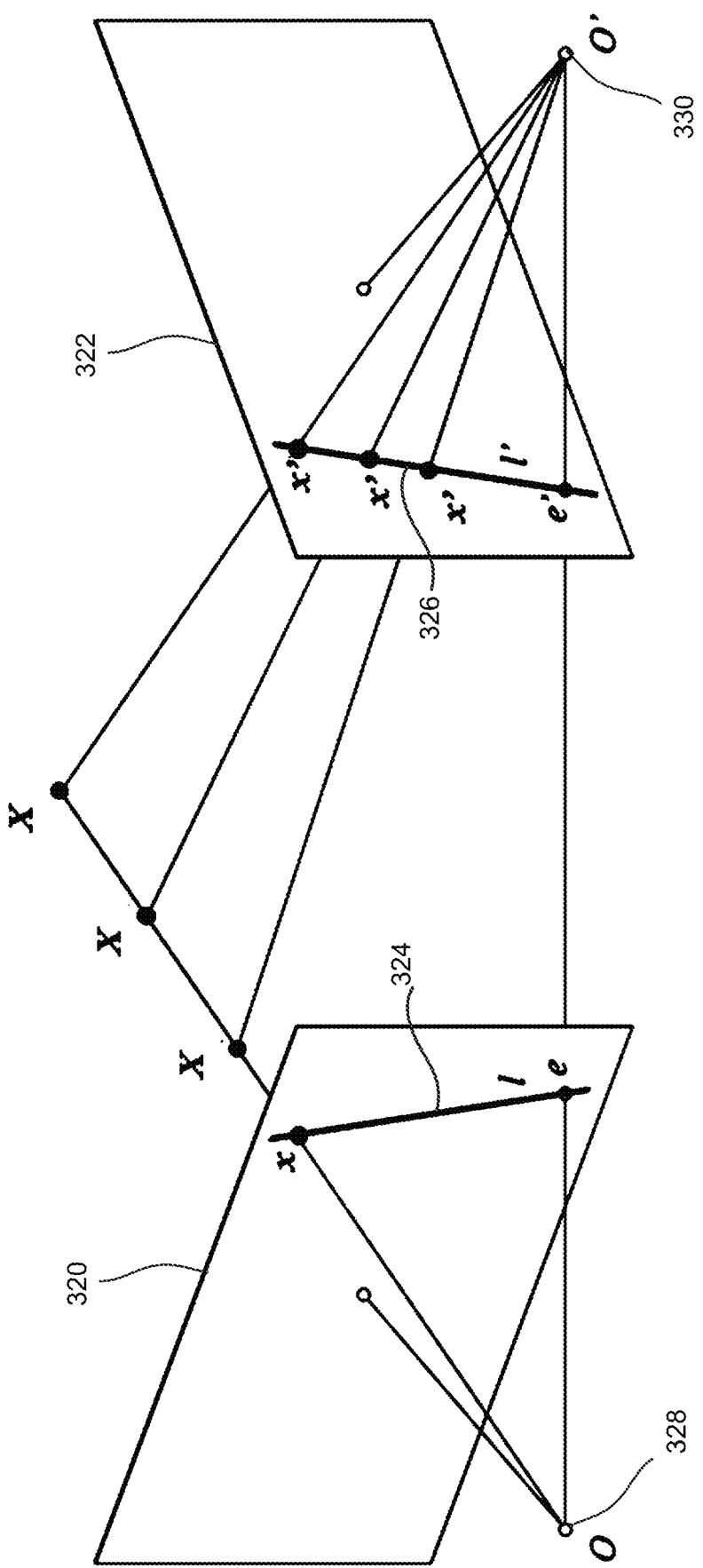
FIG. 3B shows an example of the epipolar relationship between two cameras used for optical flow calculation according to some embodiments.

FIG. 3B shows an example of the epipolar relationship between two cameras (left camera 328 position and right camera 330 position). For each point in an image captured by one camera, the epipolar relationship between that camera and another camera allows the corresponding point in an image captured by the other camera to be determined. For two cameras, such as cameras 328 and 330, the intersection between the line connecting the two cameras and the image planes yield the respective epipoles. In FIG. 3B, e is the epipole of camera 328 and e' is the epipole of camera 330. Then, with respect to camera 328 and any of the object Xpositions in 3D space, the epipole line on the image captured by camera 330 is l'. That is, considering x, which is the pixel, in the image plane of camera 328, corresponding to any shown Xposition in 3D space, it is guaranteed that the corresponding pixel will be found on the corresponding epipolar line l' 326 in image 322. Likewise, in image 320, the pixel corresponding to any of the pixels x' in image 322 can be found on the corresponding (conjugate) epipolar line l 324.

Figure 3C:
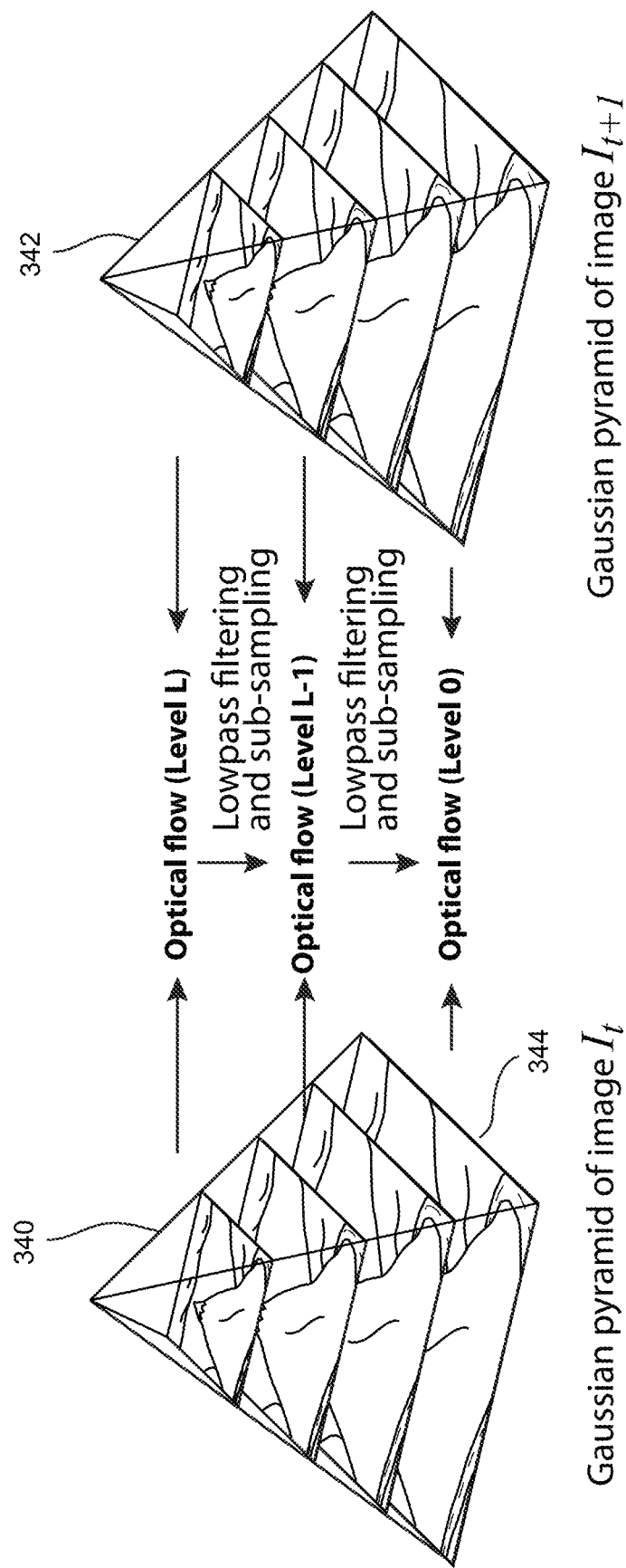
FIG. 3C shows an example image pyramid structure (referred to as "Gaussian pyramid") used for optical flow calculation according to some embodiments.

FIG. 3C shows an example image pyramid structure (referred to as a "Gaussian pyramid") used for optical flow calculations according to some embodiments. Since SGM calculations can be resource intensive, some example embodiments generate a pyramid of images at varied resolution levels for each of the two images being compared. The illustrated pyramids 340 and 342 are for image $I_t$ and $I_{t+1}$ respectively, for which the optical flow is to be determined. The image 344, at the lowest level (e.g. level 0), may be of the highest (full) resolution, and each higher level (e.g. levels L-1, L) may be at lower resolutions.

During processing, the processing of optical flow may first be made at the highest level (lowest resolution) at the lowest cost, and proceed to each subsequent level in the pyramids. Low pass filtering and subsampling implemented on the result from each level can be used to reduce the computation requirements at the next subsequent level, for example, by providing hints with respect to particular regions which require processing at the higher resolution levels.

Optical Flow Accelerator (OFA)

Figure 4:
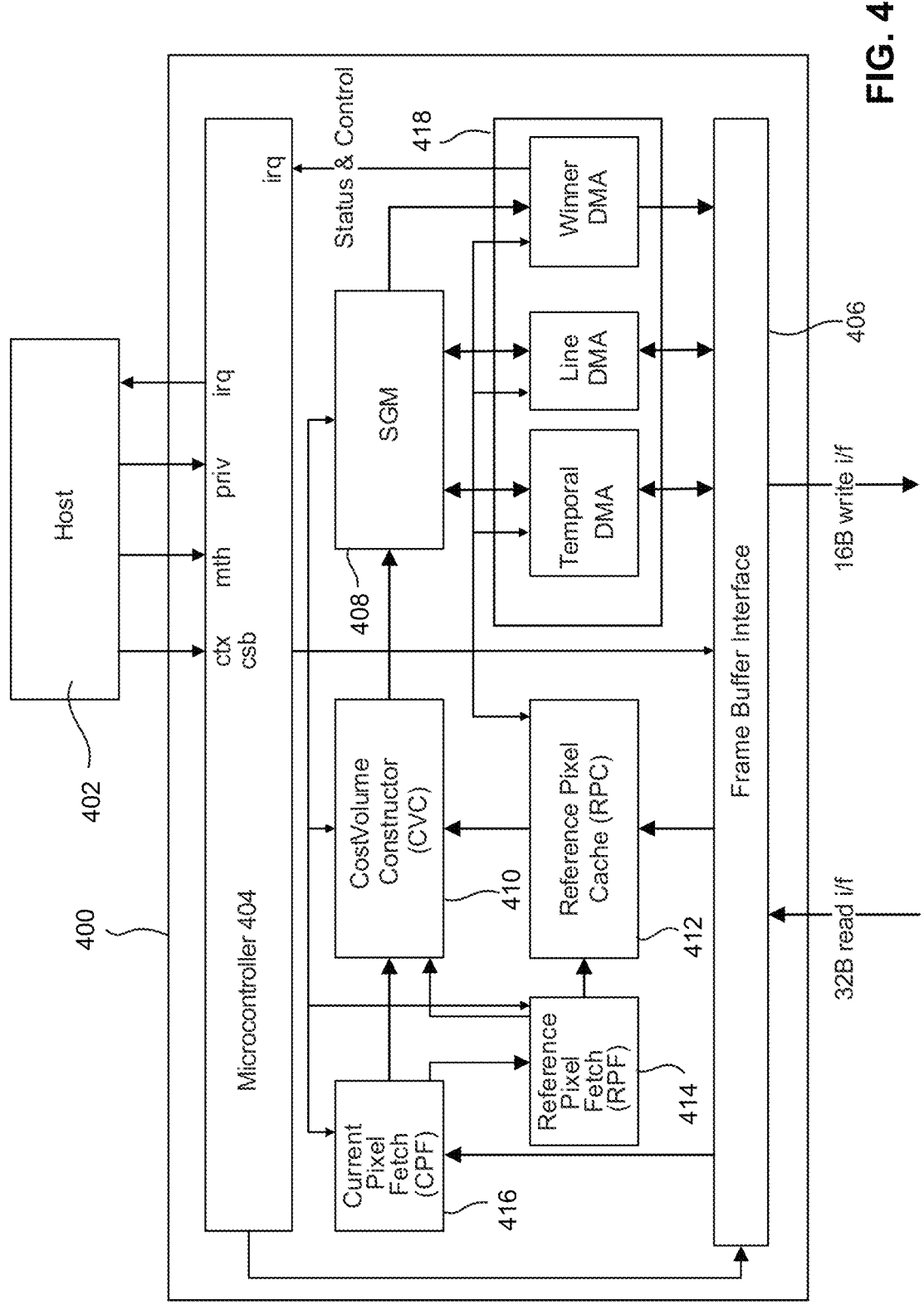
FIG. 4 schematically illustrates the circuitry of an optical flow accelerator such as that shown in FIG. 1, according to some embodiments.

FIG. 4 schematically illustrates the circuitry of an optical flow accelerator such as, for example, OFA 102 shown in FIG. 1 according to some example embodiments. In FIG. 4, the OFA 400 is shown connected to a graphics host 402 such as, for example, graphics host 104.

The OFA 400 circuitry comprises a microcontroller 404, a framebuffer interface 406, an SGM block 408, a cost volume constructor (CVC) block 410, a reference pixel cache (RPC) block 412, a reference pixel fetch (RPF) block 414, a current pixel fetch (CPF) block 416 and a DMA block 418.

The microcontroller 404 in the OFA 400 connects to host 402 from which it receives instructions and data. The microcontroller 404 also connects multiple components in the OFA 400 to control the operations in the OFA in accordance with instructions received from host 402.

The microcontroller 404 has interfaces for signals such as, for example, context switch signals, microcode for certain instructions, addresses and other data, privilege bus, and interrupt interface with the host 402. It will process the microcode, address, data and/or other signals received and drive the rest of the OFA. It also performs error handling, and may perform other tasks such as, for example, rate control and general (e.g. macroblock level) housekeeping, tracking and mode decision configuration.

The framebuffer interface 406 enables the OFA 400 to read from and write to a frame buffer. For example, data such as the image frames that are input to the OFA may be read in to the OFA via the framebuffer interface 406 in accordance with control signals received from the microcontroller 404. The optical flows and disparity maps generated as output by the OFA 400 may be written to the framebuffer via the framebuffer interface 406.

The SGM block 408 includes circuitry for 1D and/or 2D SGM operations, historical and/or temporal path cost generation, and winner decision. Block 408 may also support aspects of postprocessing. According to some embodiments, the SGM circuitry includes support for three different types of searches for pixel differences (disparities), for example, along horizontal lines, along epipolar lines and within a rectangular area pointed by a "hint" (e.g. fixed 23×11 pixel search region around hint provided by the CPF block 416). SGM is described in Hirschmuller, H., "Stereo Processing by Semi-Global Matching and Mutual Information", *Pattern Analysis and Machine Intelligence,* 2008 ("Hirshmuller 2008"), which is incorporated by reference in its entirety. An implementation of SGM in a FPGA based implementation is described in Stefan K. Gehrig et al, "A Real-Time Low-Power Stereo Vision Engine Using Semi-Global Matching", *International Conference on Computer Vision System,* 2009.

The SGM block 408 may be configurable to enable the 1D/2D SGM to be performed along a configurable number of paths (e.g. 4 or 8 paths). The SGM processing may also be configurable for different disparity levels (e.g. 128 or 256 disparities) for stereo SGM and epipolar SGM. The "disparity levels" parameter defines the search space used for matching. That is, when the disparity level is D, for each pixel p in the base image, D pixels in the reference image are searched for matching creating D disparity levels associated with p.

The SGM block 408 may, additionally, in some embodiments implement any or none of equiangular subpixel interpolation, adaptive smoothing penalties, and eSGM and wavefront processing (e.g. for bandwidth saving). The equiangular subpixel interpolation can be performed for subpixel refinement, and, in some embodiments, may be enabled or disabled based on a configuration parameter.

The SGM implementation in OFA 400 additionally provides a unified architecture for both SGM based optical flow and stereo disparity, and provides configurable scalability between quality and performance. The SGM implementation may also provide for configurable motion vector/disparity granularity (e.g. minimum 1×1 to maximum 8×8), configurable number of disparity levels and search range, and/or cost calculation on original resolution to preserve matching precision.

The SGM block 408 adapts SGM to be applied to 2D areas in order to, among other aspects, more accurately and reliably detect foreground objects and motion. A pyramidal approach is implemented to reduce the complexity of applying SGM in 2D and to facilitate hardware implementation of the technique. The SGM implementation in some embodiments may also include a wavefront processing mode and eSGM which can dramatically reduce the required bandwidth. In some embodiments, eSGM is further refined to achieve 1.5× improvement in performance compared to the original eSGM. Reduced cost precision can be used in some embodiments to narrow the required datapath width without a noticeable reduction in quality.

Figure 6:
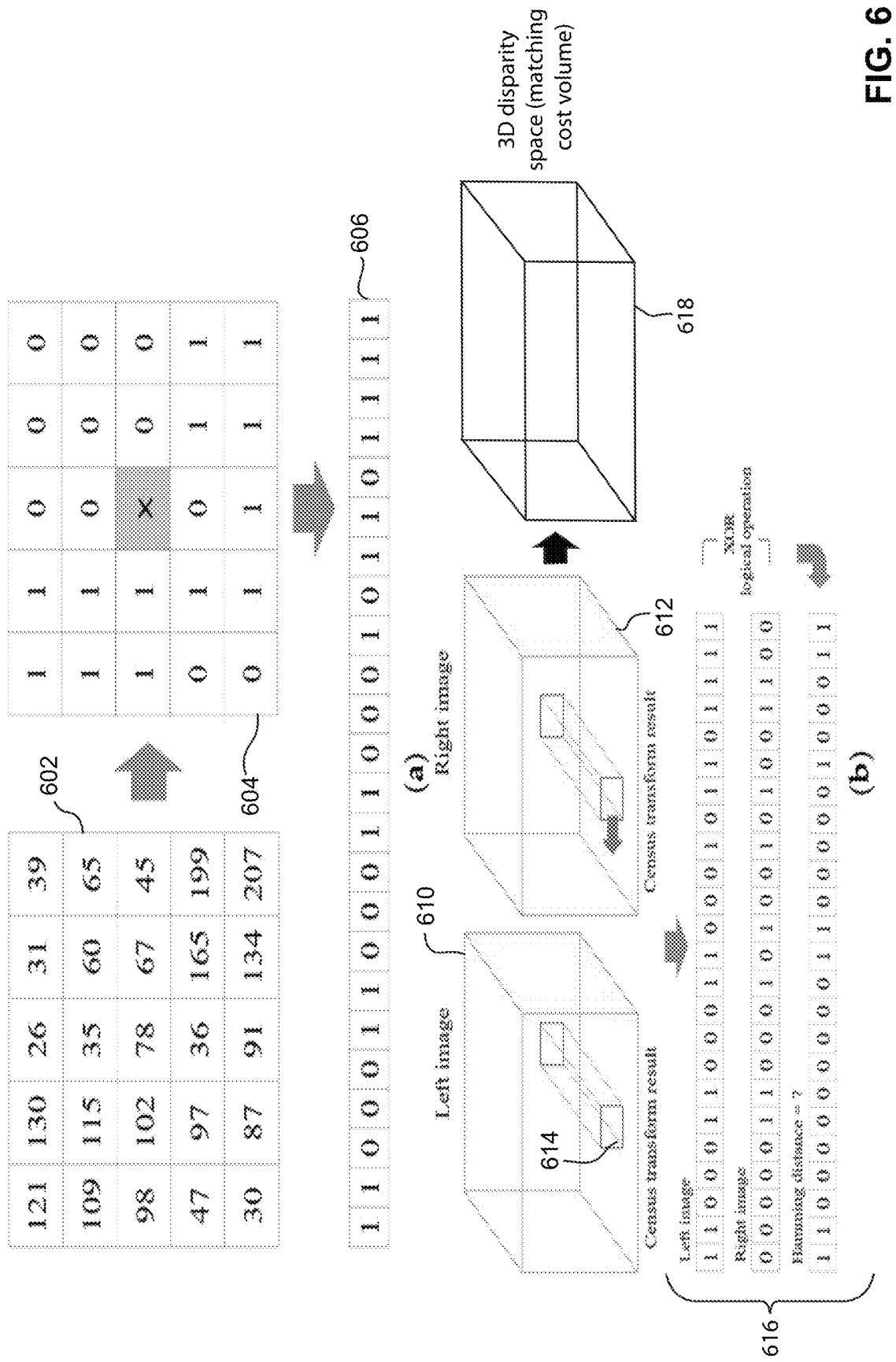
FIG. 6 shows an example of some computations performed by the consensus transform and hamming distance (CT and HD) circuitry such as that shown in the OFA of FIG. 4, according to some example embodiments.

The CVC (Cost Volume Constructor) block 410 includes circuitry to generate the cost volume corresponding to input images. The "cost volume" (also called "matching cost volume") is a three dimensional array in which each element represents the matching cost of a pixel at a particular disparity level. The cost volume 618 shown in FIG. 6 is an example.

The CVC block 410 is configured for two major functions: performing census transform (e.g. 5×5 census transform) for both current and reference pixels and calculating the hamming distance between current and reference pixel census transformed data blocks (CT data blocks).

The current pixel fetch (CPF) block 416 operates to obtain the next pixel to be evaluated. The reference pixel cache (RPC) block 412 and the reference pixel fetch (RPF) block 414 operate to obtain and store the reference pixels that correspond to each pixel fetched by the CPF block. The RPC is the cache for storing reference pixels, and may reduce the memory bandwidth due to reference pixel fetch. The RPC accepts the fetch request from the RPF, fetches the reference pixels from external memory, and outputs reference pixel block to the CVC block.

The CPF block 416 includes circuitry for fetching the current pixel and, when applicable, fetching the hint. For example, although the CPF block 416 is mainly for current pixel fetch, in some embodiments, the CPF block 416 is also configured to fetch the corresponding hint (e.g. indicating areas to be evaluated) when the OFA is in pyramidal SGM optical flow mode. In some embodiments, due to the zigzag processing of the OFA (see FIG. 8B), the CPF block 416 may be configured to fetch the current pixels in an order corresponding to that pattern. In some embodiments, fetching the current pixel includes fetching a current pixel block of a size such as, for example, 9×9 pixels. That is, due to OFA features such as 5×5 census transform and 5×5 cost aggregation, the fetching of a block of a size such as 9×9 for each current pixel may be necessary.

The DMA block 418 may include separate circuitry for the DMA of different data. Each DMA may be configured to offload the loading or storing of a particular data set from the microcontroller and/or other circuit blocks. The OFA may have several DMAs, including current DMA which fetches current pixel data; hint DMA which fetches hint motion vector data; winner and output DMA which outputs flow/disparities and costs to temporary/history buffers which read/write temporary path cost/candidates info required by the SGM block or other memory. According to an embodiment, the current pixel DMA is a read only DMA and enables the SGM block to support fetch requests of 32×8 pixels, the hit DMA is a read only DMA and supports fetch request of size 8×8 motion vectors (e.g. 32×8 bytes), the winner flow DMA and the winner cost DMA are each configured as write only and supports write requests of size 32×8 bytes.

As also noted above, target applications for the OFA 400 may include low-level computer vision tasks such as, for example, ADAS, and DL based video inferencing. To reduce end-to-end system latency for ADAS applications, large problems, such as processing a 2-8 megapixel image through one application that consists of a long chain of algorithm steps, can typically in some embodiments be partitioned spatially into subframes to synchronize among SoC components with shorter latency.

The general programming model for the OFA is similar to that of many host-based engines like hardware video decoders and encoders. In some embodiments, the programming model includes the driver software (executing on a processor such as the CPU 108 or GPU 106) allocating the image surfaces and preparing the required input information and then kicking off the microcontroller of the OFA (e.g. microcontroller 404 of the OFA 400). Microcode on the microcontroller can parse the input information/commands and configure hardware registers, and then kickoff (i.e. initiate or trigger) the OFA to perform the processing required by the input information/command.

When the OFA is triggered (e.g. kicked off by the microcontroller as commanded by the driver), the CPF block 416 starts first and sends the command to the RPF block 414. The RPF block 414 transfers the command to the CVC block 410 and starts the RPC block 412 for reference pixel fetch. When reference pixels and current pixels are ready, the CVC block 410 calculates the cost and sends them to the SGM block 408. The SGM block 408 does the decisions and sends its results to the DMA block 418. The DMA block 418 handles all the internal framebuffer interface 406 requests with proper formats.

The OFA may be configured to issue an SGM pass done interrupt to the microcontroller once it finishes one pass of SGM processing. Microcode in the microcontroller may keep track of SGM passes completed, and may be configured to report the frame (or subframe) completed status to the driver so that the driver can control the next frame (or subframe) kickoff.

The OFA, in certain embodiments, may support input images and output flow maps of any size. Some example embodiments support any image size between 32×32 pixels to 8192×8192 pixels as input, and output flow map or disparity map size may be based on the input image size and the grid size. For example, the output flow map height may be based upon with of input image height multiplied by (K×grid size y), and output flow map width may be based upon the input image width multiplied by (K×grid size x), where K (e.g. K=1 or 2) may be configurable to enable/disable downsampling. In some embodiments, the size of the input hint height/width (e.g. in pyramidal SGM mode) may be based on input image height/width and grid size and may be similarly configurable based on K.

Figure 5:
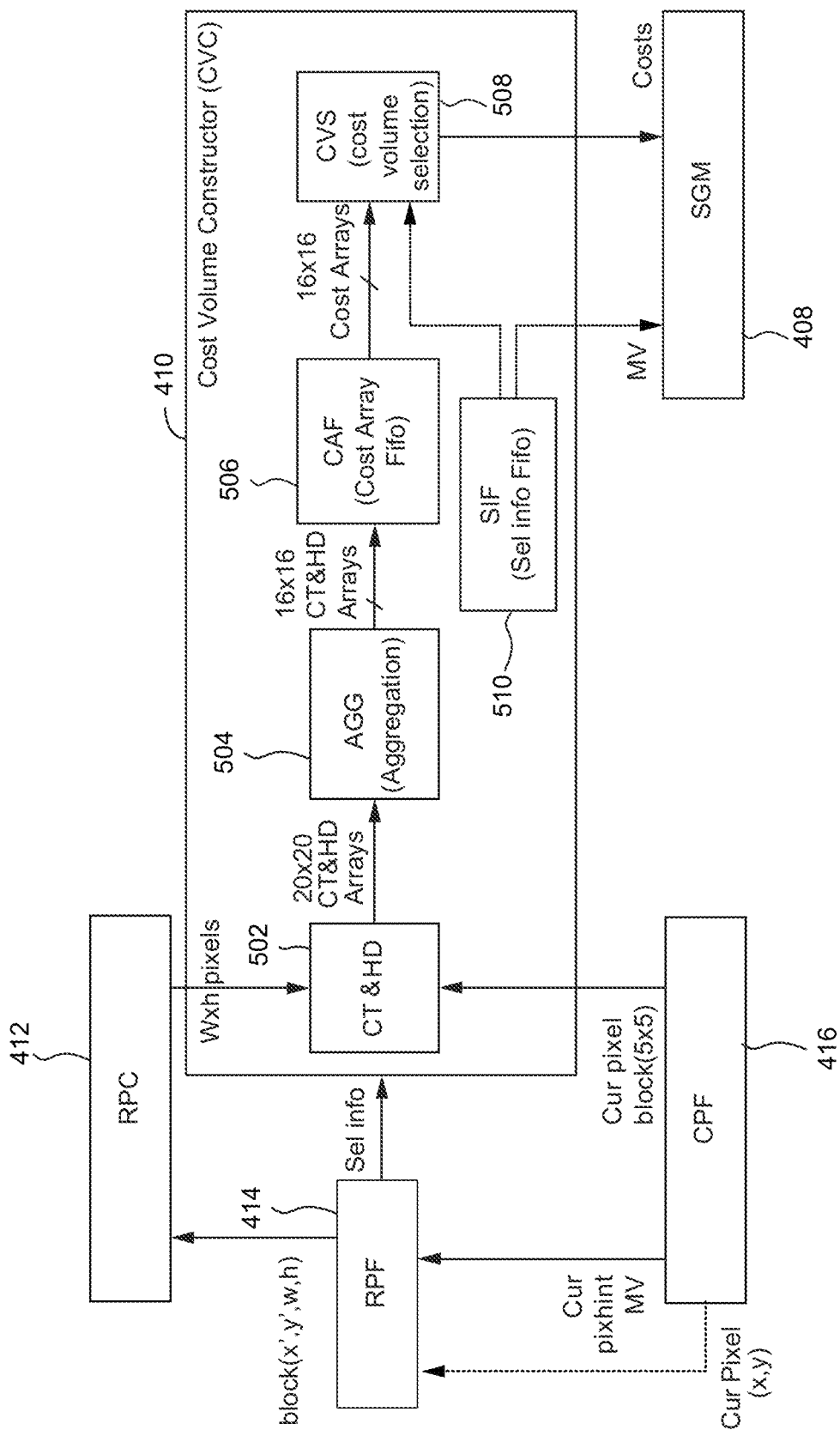
FIG. 5 schematically illustrates circuitry of a cost volume constructor (CVC) such as that shown in the Optical Flow Accelerator (OFA) of FIG. 4, according to some embodiments.

FIG. 5 schematically illustrates circuitry of the CVC block 410 of the OFA, according to some embodiments. As noted above, the CVC block 410 is configured to generate the cost volume (e.g. matching cost volume 618) for determining optical flow and stereo disparity. The CVC block 410 performs census transform (e.g. 5×5 pixel census transform) for both current pixel and reference pixel, and calculates the distance (e.g. hamming distance) between current and reference CT data blocks.

According to some embodiments, stages of processing in the CVC 410 include a CT & HD block 502, an aggregation (AGG) block 504, a cost array FIFO block 506, a selection information FIFO block 510 and a cost selection (CVS) block 508.

The CT&HD block 502 performs census transform and hamming distance calculations. The census transform (CT) is a robust patch representation introduced by Zabih and Woodfill in "Non-parametric Local Transforms for Computing Visual Correspondence", in *Proceedings of the Third European Conference—Volume II on Computer Vision* (ECCV '94), Jan-Olof Eklundh (Ed.), Vol. II. Springer-Verlag, London, UK, 151-158, which is hereby incorporated in its entirety. The census transform R(P), which may be used in some embodiments, is a non-linear transformation which maps a local neighborhood surrounding a pixel P to a binary string representing the set of neighboring pixels whose intensity is less than that of P. Each census digit ξ(P, P') is defined by the following relationship.

$$\xi(P, P') = \begin{cases} 0, & P > P' \\ 1, & P \le P' \end{cases}$$

That is, for a pixel P, each pixel P' in its neighborhood is represented as a 1 or a 0 based on whether P' is greater than or equal to or is lesser than P, respectively. The size of the local neighborhood of pixel P for census transform may be configurable. Based upon an output quality versus chip area tradeoff for the OFA circuitry, in some example embodiments, a 5×5 census transform is used in the OFA.

For each pixel P, the census transformed binary strings representing the set of neighboring pixels for two images is then subjected to the hamming distance (HD) determination. The HD is a distance metric used to measure the difference of two bit string values. In the context of the CT, the HD is the number of the different bits in two CT strings. The HD for pixel P can be determined by XOR'ing the two bit strings As each pixel in a base image is obtained as the current pixel for processing, the CT&HD block 502 receives a current pixel block (e.g. a 5×5 pixel block with current pixel p as the center pixel) from the base image as obtained by the CPF block 416 and a reference pixel block (e.g. a pixel block with reference pixel p' as center pixel) from the reference image retrieved from the RPC block 412. The reference pixel block may be of size W×H, where W and H can be chosen so that the number of pixels in the data block equals the number of disparity levels such that W×H=D. The reference pixels corresponding to the current pixel may be cached in RPC block 412 upon the RPF block 414 being triggered to fetch the corresponding reference pixel by the CPF block 416 which provides the RPF block 414 with the current pixel and/or the current pixel motion vector hint (in pyramidal SGM) or information thereof. The CPF block 416 and RPC block 412 can read the pixels and/or pixel data from a framebuffer through the framebuffer interface 406.

Thus the CT&HD block 502 processes each pixel of a current base image by receiving the corresponding current and reference pixel blocks from the CPF block 416 and the RPC block 412, respectively. The current pixel block for pixel p, may be a 5×5 pixel block, such as the pixel block 602 in FIG. 6, with p as center pixel. The current pixel block may be submitted to the census transform, and as shown in FIG. 6, converted to a block 604 of 1s and 0s and further to a bit string 606. Thus, after being subjected to the census transform, the current pixel p is represented by a bit string that corresponds to its neighborhood (e.g. such as the 5×5 neighborhood in this example).

In processing the reference pixel block for pixel p, the CT&HD block 502 may generate a census transformed bit string for each pixel p' in the W×H pixel reference pixel block.

The HD circuitry in block 502 calculates, for each pixel p' in the reference pixel block, a bit-wise XOR of the census transformed bit strings (or census transformed bit strings after aggregation in block 504) for the current pixel p and reference pixel p' in order to determine the hamming distance corresponding to each p'. In order to generate D disparity levels for current pixel p, D Hamming distance computations are performed in the block 502. The matching cost for D disparity levels at a given pixel position, p, in the base image is computed by computing the Hamming distance with D pixels in the reference image. The matching cost, C(p,d), is computed at each pixel position, p, for each disparity level, d, where 1≤d≤D.

Cost aggregation in aggregation block 504 is used, in some embodiments, for improving the robustness of matching. Cost aggregation may be desired because single-pixel based cost may be ambiguous and/or erroneous. In order to perform cost aggregation, neighbor pixel costs are added (i.e. summed) to the center pixel. In some embodiments, the summed pixel costs at the center pixel can be averaged to reduce the cost width (i.e. to reduce the number of bits to represent the summed costs). The cost aggregation window size used in OFA may be configurable. In some embodiments, the cost aggregation window is 5×5 pixels. Cost aggregation can be applied to each reference pixel p' after the disparities calculated (e.g., by Hamming distance calculations as described in relation to block 502) to adjust the matching cost at each pixel p'. Additionally, or alternatively, cost aggregation can be performed on the census transformed bit strings for each p' before the disparities are calculated and consequently adjust the respective reference pixel bit strings in accordance with its neighborhood (e.g., a 5×5 aggregation window with reference pixel p' as center pixel) before they are subjected to the Hamming distance calculation with the census transformed bit string of current pixel p.

The cost array block 506 receives the matching costs for the reference pixels p' from the aggregation block 504, or in some embodiments, directly from the CT&HD block 502. The block 506 may implement a first-in-first-out (FIFO) storage to store the received bit strings.

The cost volume selection block 508 receives the cost arrays for each current pixel p, and supplies the costs as required by the SGM block. Because of the irregular search pattern in epipolar SGM optical flow mode, the cost calculation (e.g. in cost volume selection block 508) may be performed over a 16×16 pixel block. Then the costs at valid locations are selected and sent to the SGM block 408 in accordance with the search pattern. The selection of valid locations may be based upon input from selection information FIFO block (SIF block) 510. The SIF block 510 provides the SGM block 408 with motion vectors corresponding the current pixels.

FIG. 6 shows an example of some computations performed by the CT and HD block 502, according to some example embodiments.

The pixel block 602, which in the example is a 5×5 pixel block, may be the current pixel block fetched when the CPF block 416 fetches the center pixel x as the current pixel. The value of each pixel in the fetched pixel block may represent an intensity value. Pixel block 604 may be a representation of the pixel block 602 after it has been subjected to the census transform, for example, in the CT&HD block 502. As noted above, the census transform transforms the representation to binary in accordance with a predetermined or configured threshold intensity level. The one dimensional array 606 is derived from the census transformed block 604 by linearly arranging the rows from top to bottom. 606 is also referred to as a bit string.

The arrays 610 and 612 represent census transform results for corresponding left and right stereo images respectively, according to an example. Array 610 may be considered as the collection of census transformed results (i.e. the one dimensional bit arrays 606 corresponding to each pixel of the image) for each pixel in the left image. Likewise, array 612 may be considered as the collection of census transformed results for each pixel in the right image. 614 illustrates an example of the current pixel p with its bit string in the left image and a reference pixel with its bit string in the right image.

616 shows the hamming distance calculation by performing an XOR operation on the census transformed results taken from the left and right images. The census transform result cubes 610 and 612 are compared to generate a 3D disparity space ("matching cost volume" or simply "cost volume") 618.

Figure 7:
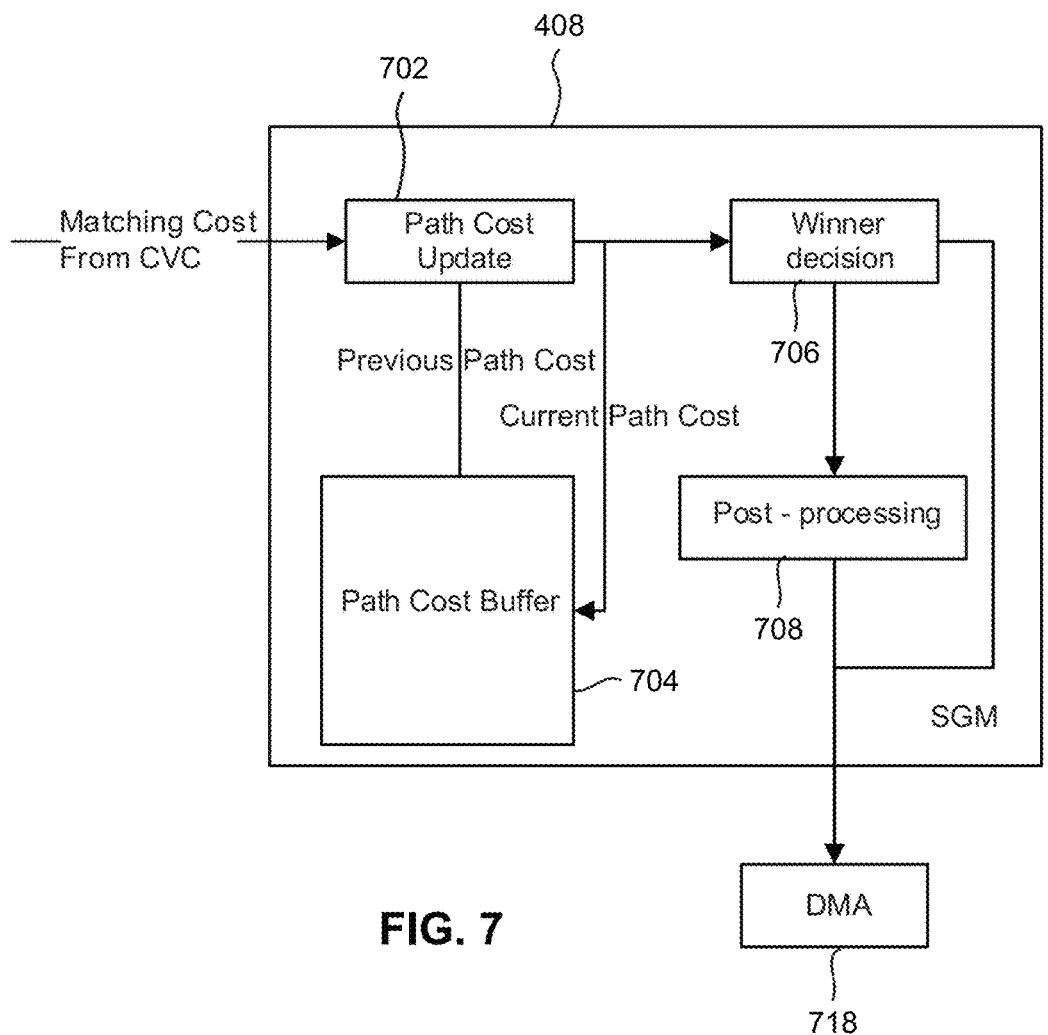
FIG. 7 is a schematic block diagram of a semi global matching (SGM) circuitry such as that shown in the OFA of FIG. 4, according to some embodiments.

FIG. 7 is a schematic block diagram of a hardware SGM block 408 according to some embodiments. In the OFA 400, the SGM block 408 is the subunit that receives the matching costs from the CVC block and which performs 1D/2D SGM and does post-processing on the resulting disparity (e.g. winner disparity). SGM is a dynamic-programming based algorithm, first proposed by H. Hirschmuller in 2005 (and also described in Hirschmuller 2008 noted above), and was used for stereo disparity estimation. SGM and its variants have been top ranking stereo algorithms for many years until the relatively recent proposed DL based methods.

The matching costs from the CVC are received by a path cost update block 702, which also receives a previous path cost from a path cost buffer 704. The path cost output from the path cost update block 702 is stored in the path cost buffer 704. The path cost update block 702 output is also provided to winner decision block 706, which also receives a previous winner value after the post processing. The winner decision that is output from the winner decision block 706 is provided to the post processing block 708. After the post processing, the result is provided back to the winner decision block 706, and also to DMA block 718.

Key features supported by the SGM block 408, in some embodiments, include supporting a configurable maximum number of disparities (e.g. 256 or 128 disparities, where the lower number of disparities can be selected for faster performance), support configurable number of directions in which to evaluate matching costs (e.g. 2/4/8: (horizontal+vertical)/(horizontal+vertical+left+right)/(horizontal+vertical+left+right+diagonal)), and support for a configurable number of SGM passes (e.g. 1/2/3).

Postprocessing may be performed to fix errors that the stereo algorithm has caused and providing a dense disparity image without gaps. The post-processing performed in the SGM block may include subpixel interpolation, vz-index to motion vector conversion, disparity to motion vector conversion, etc.

Figure 8A:
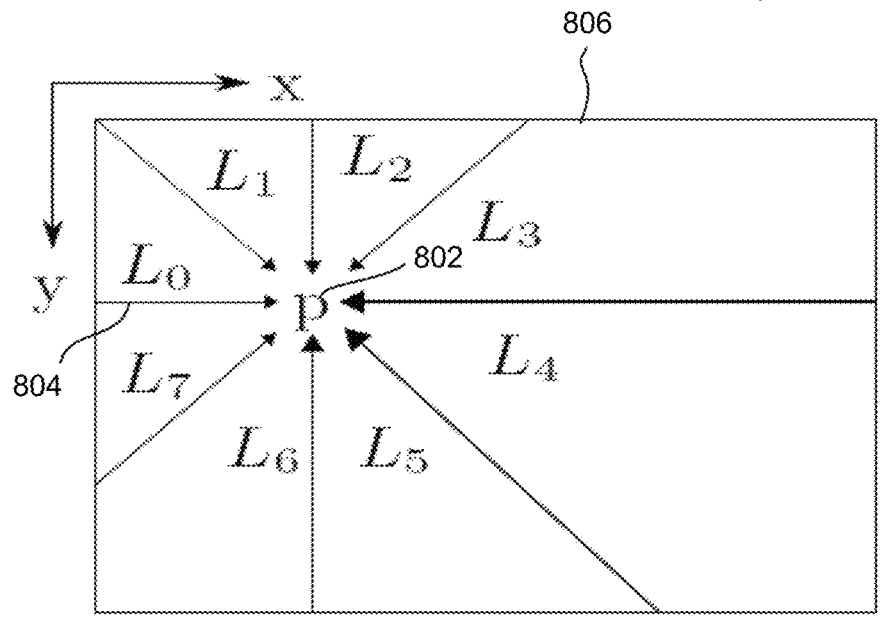
FIG. 8A illustrates example path directions that are configurable for SGM computations that can be used in some example embodiments.

FIG. 8A illustrates example path directions for SGM that can be used in some embodiments. In some embodiments, the number of paths 804 considered when determining path costs for a pixel p 802 may be configurable. For example, in the illustrated image frame 806, the matching cost associated with pixel p 802 can be determined based on four paths (e.g., up L2, down L6, left L0, right L4) or eight paths (e.g. L0-L7). Some other embodiments, may use another subset of the eight paths L0-L7 and/or additional paths.

In some embodiments, the 1D SGM used in epipolar SGM optical flow mode is a 1D SGM process that is the same as in stereo case. The input to this stage is the matching cost volume or part thereof that is generated from cost volume construct stage, the output is the best disparity with the minimum aggregated path cost from all directions. The 1D minimum aggregated cost path determination includes computing the current cost at d disparity position, using the matching cost value, the previous cost values at disparities d−1, d, and d+1, and the minimum of the previous cost values.

Figures 8B, 8C, 8D:
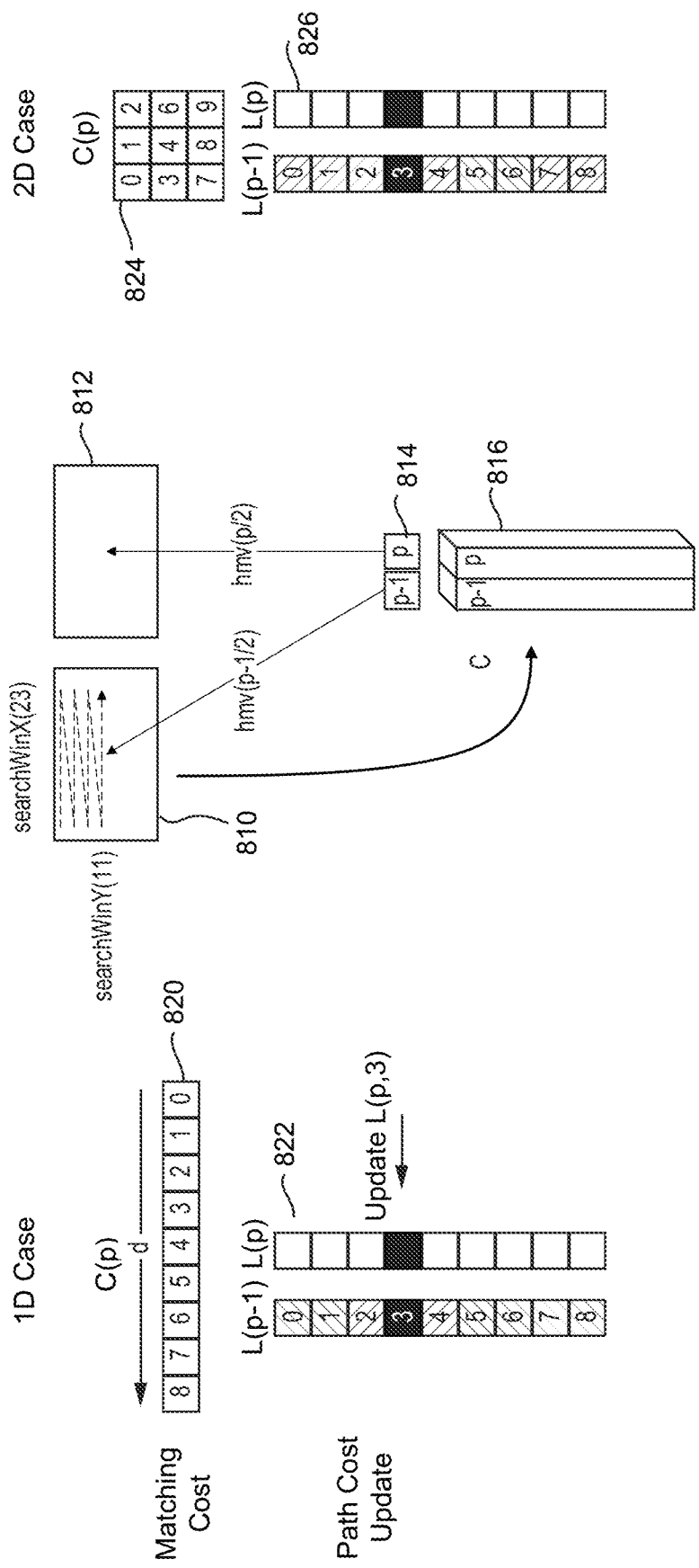
FIG. 8B illustrates matching cost determination in one dimensional (1D) implementations, according to some embodiments.
FIG. 8C and FIG. 8D illustrate matching cost determination in two-dimensional (2D) implementations, according to some embodiments.

FIG. 8B shows an example path cost update in 1D SGM optical flow. Each array 822, which represents path costs L(p, d) and L(p−1,d), includes d path costs. The notation L(p,d) represents the path cost along path L for pixel p at disparity level d. The C(p) cost array 820 shows corresponding matching costs for pixel p, for d pixels, along one path.

In some embodiments, the path cost L update for pixel p along a direction r for d disparity levels is as follows:

$$L_r(p, d) = C(p, d) + S(p, d) - \min_i L_r(p - r, i)$$

$$\text{where } S(p, d) = \begin{cases} L_r(p - r, d) \\ \min L_r(p - r, d \pm 1) + P1 \\ \min_i L_r(p - r, i) + P2 \end{cases}$$

Basically, in this recursive computation, in order to determine the path cost L for a pixel p along a path r, all path costs from the previous pixel along direction r (represented as "p−r"), and two penalty terms P1 and P2 are used. The first term (C(p,d)) is the sum of all pixel matching costs for the disparities of d. The second term adds a constant penalty P1 for all pixels q in the neighborhood Np of p, for which the disparity changes a little bit (i.e. 1 pixel). The third term adds a larger constant penalty P2, for all larger disparity changes. Using a lower penalty for small changes permits an adaptation to slanted or curved surfaces. The constant penalty for all larger changes (i.e. independent of their size) preserves discontinuities. P1 and P2, in relation to SGM techniques, are referred to as matching cost smoothing penalties.

As an optimization technique in some embodiments, in addition to storing all the path cost values, the minimum path cost of previous pixels are also stored in an on-chip buffer to avoid recalculating $\min_i L_r(p-r,i)$.

Certain embodiments adapt the SGM technique which was originally proposed for searching along 1D paths, to be used in 2D. For example, whereas stereo disparity and epipolar SGM (e.g. in the static word optical flow mode 204) use the 1D implementation of SGM in the system 100, the pyramidal SGM implementation (e.g. in the general word optical flow mode 202) is based on a 2D implementation. FIG. 8C illustrates example search windows 810 and 812, and search patterns that are used for updating path costs for a pair 814 of pixels p and p−1, and the corresponding path cost data structure 816. FIG. 8D shows how the path costs 826 for pixels p and p−1 can be updated when in 2D implementation. In the 2D implementation, the C(p) 824 cost array is two dimensional and corresponds to the 2D search area such as the search window 810 or 812. One of the key changes from 1D to 2D in SGM implementations in some embodiments is the path cost update part (v corresponds to a motion vector in the following equation) which can be represented as:

$$L_r(p, v) = C(p, v) + S(p, v) - \min_i L_r(p - r, i)$$

$$\text{where } S(p, v) = \begin{cases} L_r(p - r, v) \\ \min_{\|\hat{v}-v\|<R} L_r(p - r, \hat{v}) + P1 \\ \min_i L_r(p - r, i) + P2 \end{cases}$$

To reduce hardware implementation complexity, in some embodiments, the search window is set to 2/1 in x/y directions, and v can be identify a candidate area in the search window.

The SGM technique as proposed in Hirschmuller 2008, requires a bandwidth for read/write of the temporal path matching cost volume that is too large for hardware implementation. In order to address this issue, some embodiments implement a variant of the SGM techniques proposed in Hirschmuller 2008. The variant is referred to in this document as "eSGM". eSGM is implemented in the SGM block 408 according to certain example embodiments.

The required temporal bandwidth buffer size according to the techniques in Hirschmuller 2008 is:

temporal $BW=W \times H \times d\text{Max} \times \text{bytesPerCost}$

The eSGM method can reduce the required temporal buffer size to temporal $BW(eSGM)=W \times H \times (\text{pathNum} \times (\text{bytesPerDisp}+\text{costNum} \times \text{bytesPerCost})+\text{bytesWinnerDisp}+\text{bytesWinnerCost})$.

In hardware implementation in some embodiments, the number of aggregation paths ("pathNum") is set to 3 and bytes per disparity ("bytesPerDisp") is 1, number of costs ("costNum") is 3 for subpixel interpolation, bytes per cost ("bytesPerCost") is 1, bytes per winner disparity/cost ("bytesWinnerDisp/Cost") is 2. For 2D SGM, the costNum is 5 and bytesWinnerDisp is 4 due to need to handle mvx/mvy components.

In some embodiments, a 3-pass processing is implemented for eSGM. In order to improve performance (e.g. improve speed of the disparity calculation) in some environments, a simplified 2-pass version may be selected in some embodiments. The SGM block in some embodiments may support both 2 pass/3 pass eSGM.

Figure 8E:
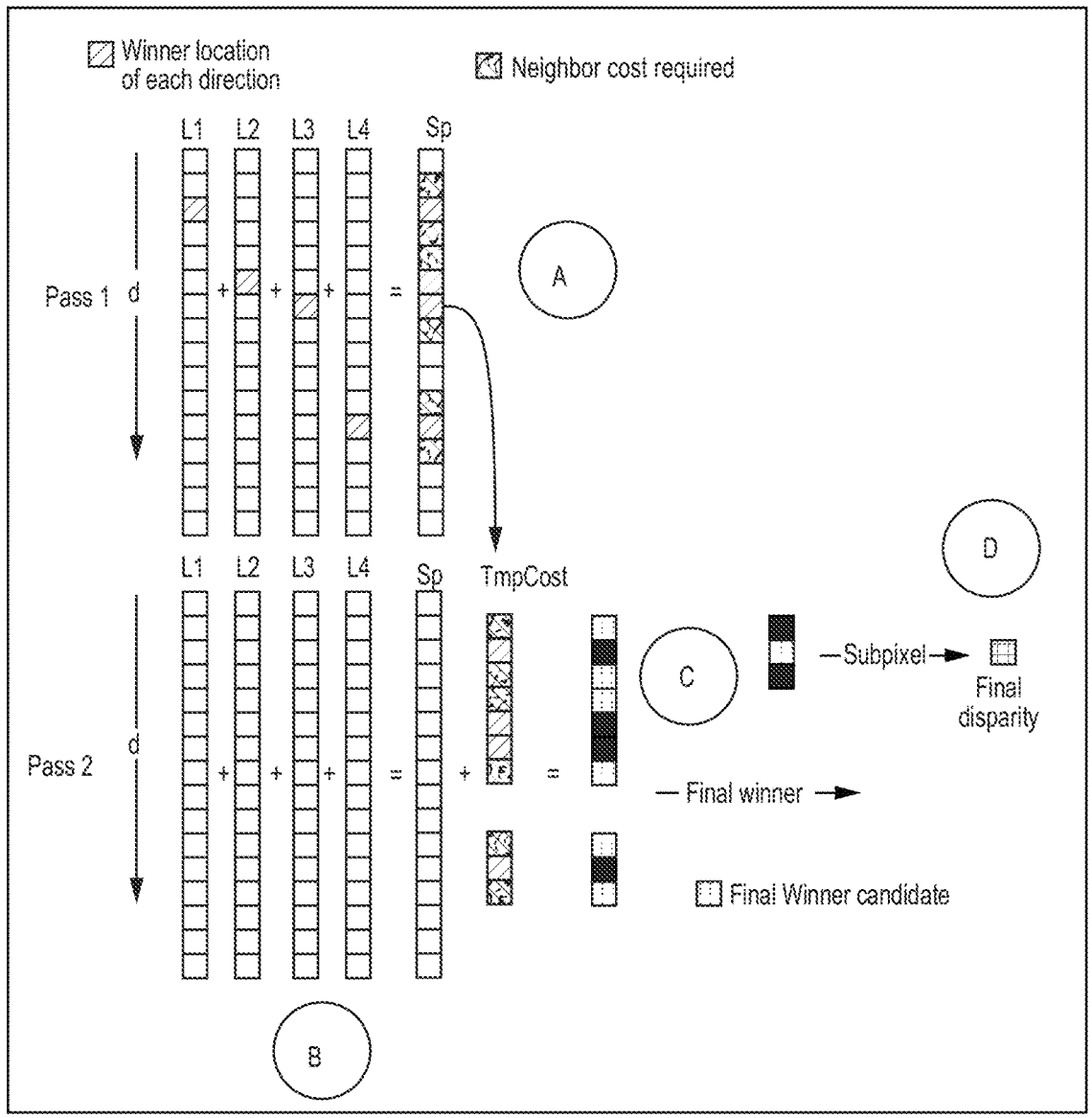
FIG. 8E and FIG. 8F illustrate multiple iterations of SGM implementations according to some embodiments.
Figure 8F:
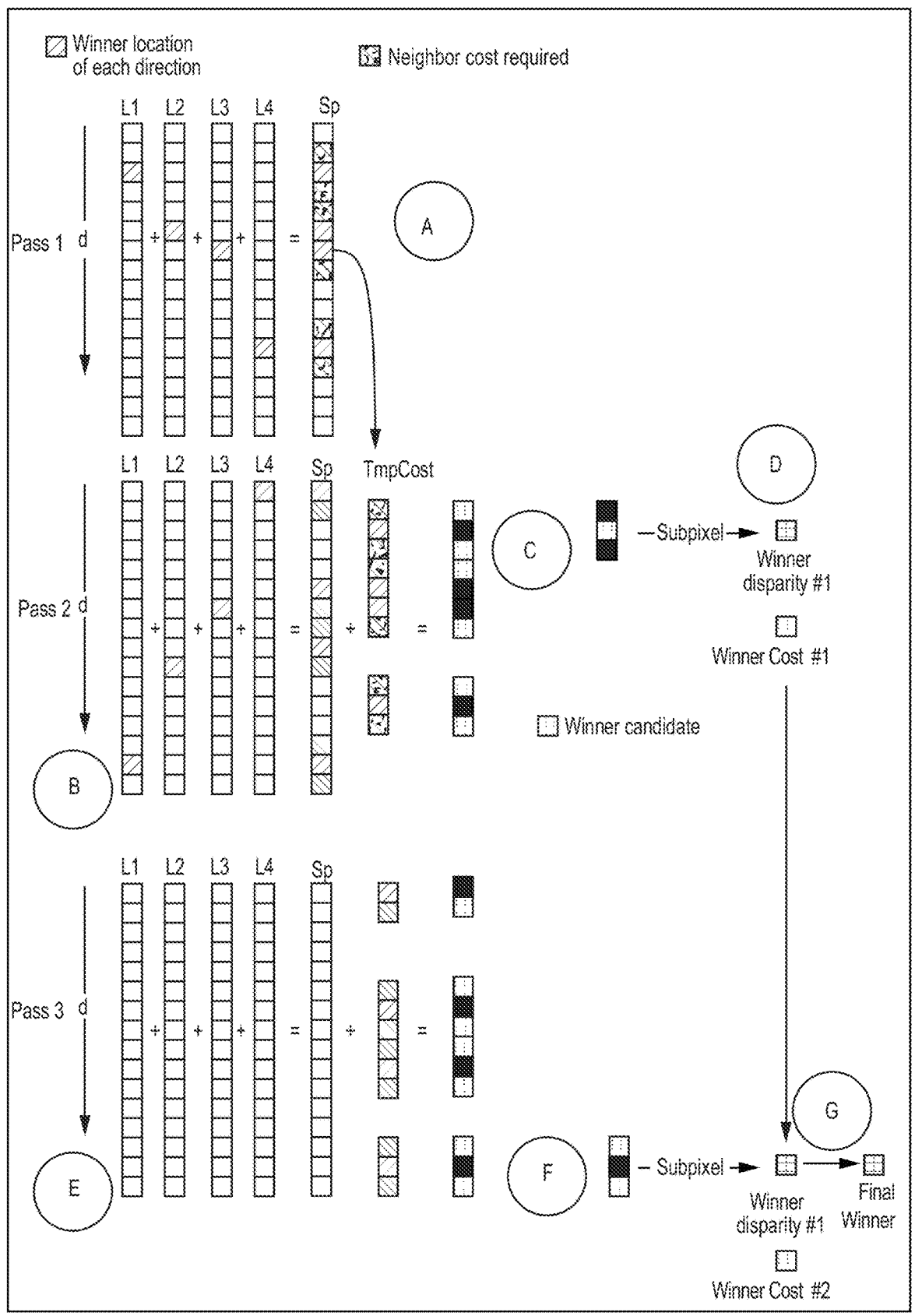
Figure 8G:
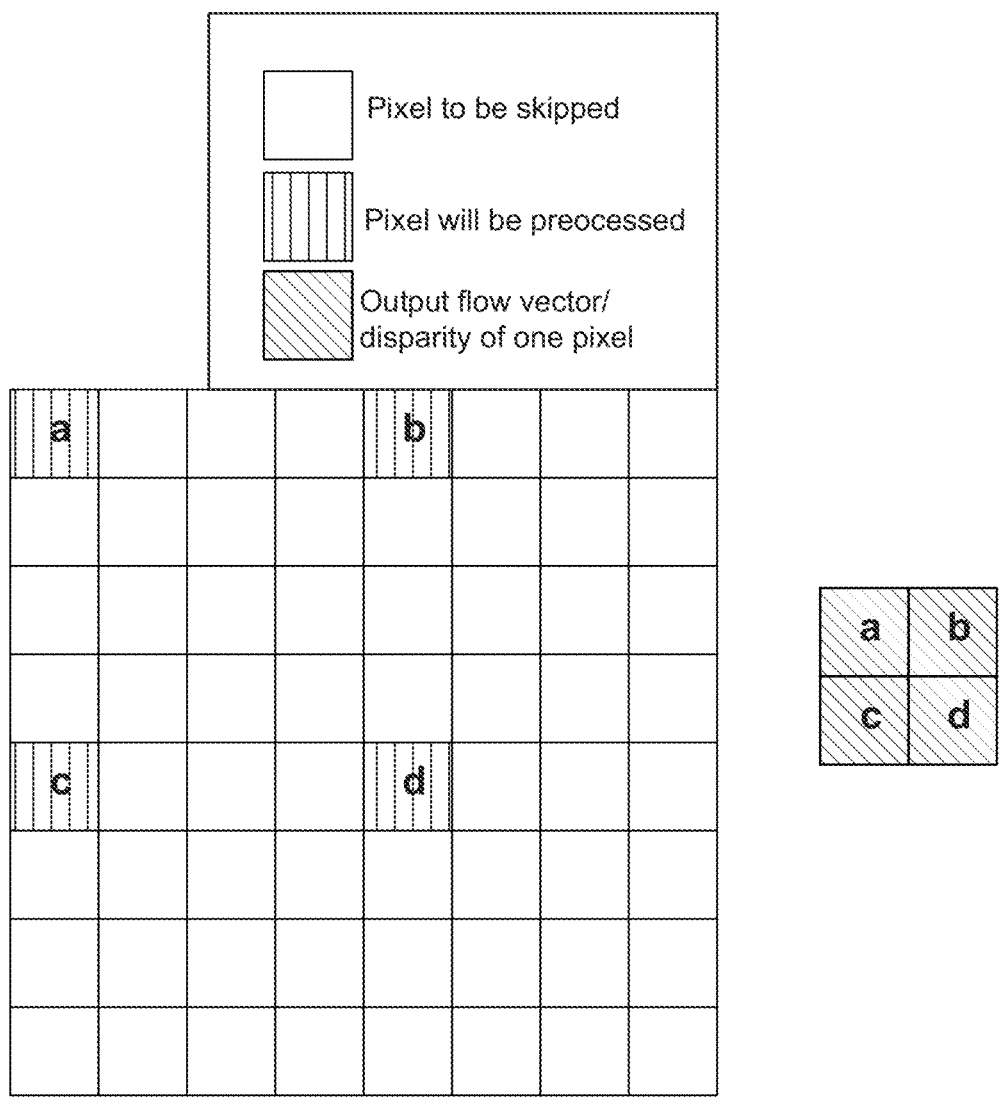
FIG. 8G is an illustration of grid size feature for OFA, according to some embodiments.

FIGS. 8E and 8F graphically illustrates a 2-pass SGM performance and a 3-pass SGM performance, respectively, according to some example embodiments.

In FIG. 8E, operation "A" shows the first pass in which the path cost array for each of paths L1, L2, L3 and L4 have a winner pixel identified by a shading pattern. The sum of all path costs is represented by the "Sp" array. "Sp" represents the winner pixels from each of the four paths, and also identifies the pixels adjacent to the winner pixels, as pixels for which neighbor information is required.

In some embodiments, the first pass is performed from the upper left of the image to the bottom right. For each pixel,
Calculate $L_r^1(p, d)$ for the 4 directions, and
Get $min_i(L_r^1(p, i))$ and the corresponding $d_{min}^1$, write out $Sp_r^1(p, d_{min}^1)$, $Sp_r^1(p, d_{min}^1 \pm 1)$, $d_{min}^1$,
where $L_{direction}^{\#pass}$(pixel location, disparity) and $Sp_{direction}^{\#pass}$(pixel location, disparity).

Operation "B" shows the second pass (no winners are shown) and illustrates the determination of final winner candidates in operation "C". The sum array from the first pass is summed with the sum of all path costs obtained in the second pass to generate the final winner candidate array. Then, the final winner is selected from the final winner candidate array. Then at operation "D", the final winner is subjected to subpixel refinement, in order to generate the final disparity.

In some embodiments, the second pass is performed from the bottom right to the upper left of the image. For each pixel, Calculate $L_r^2(p, d)$ for the 4 directions;
Load $Sp_r^1(p, d_{min}^1)$, $Sp_r^1(p, d_{min}^1 \pm 1)$, $d_{min}^1$
Get $Sp_r^2(p, d_{min}^1) = Sp_r^1(p, d_{min}^1) + Sp_r^2(p, d_{min}^1)$, similar for $Sp_r^2(p, d_{min}^1 \pm 1)$;
Get minimum $Sp_r^2(p, d')$, do subpixel interpolation to get $d_{sub}'$, write out $S_r^2(p, d')$, $d_{sub}'$
Get $min_i(L_r^2(p, i))$ and the corresponding $d_{min}^2$, write out $Sp_r^2(p, d_{min}^2)$, $Sp_r^2(p, d_{min}^2 \pm 1)$, $d_{min}^2$.

FIG. 8F illustrates an SGM implementation in which an optional third pass is performed. The first and second passes are the same as that described in relation to FIG. 8E. Then, after the first and second passes, at operation "E", path costs for L1-L4 is determined in the third pass and the sum of the third pass path costs is summed to yield winner candidates at operation "F". Then a winner selected from the third pass winner candidates is subjected to subpixel refinement to obtain a third pass winner disparity and winner cost. Then at operation "G", a final winner is selected based on the winner disparity and winner cost determined at the second pass and the winner disparity and winner cost determined at the third pass.

The third pass is performed from the upper left of the image to the bottom right. In the third pass, for each pixel,
Load $Sp_r^2(p, (p, d_{min}^2 \pm 1), Sp_r^2(p, d_{min}^2 + 1), d_{min}^2$
Load $S_r^2(p, d')$, $d_{sub}'$
Calculate $L_r^3(p, d_{min}^2)$ for the 4 directions, get the $Sp_r^3(p, d_{min}^2) = Sp_r^2(p, d_{min}^2) + Sp_r^3(p, d_{min}^2)$, similar $Sp_r^3(p, d_{min}^2 \pm 1)$;
Get the minimum $S_r^3(p, d'')$, do subpixel interpolation to get $d_{sub}''$
if $S_r^3(p, d'') < S_r^2(p, d')$, output $S_r^3(p, d'')$ and $d_{sub}''$, else output $S_r^2(p, d')$, $d_{sub}'$.

In some embodiments, the SGM block (e.g. SGM block 408) implements an adaptive large penalty. The adaptive large penalty (adaptive P2) is implemented at least in some embodiments in the SGM block, according to existing literatures, the advantage of adaptive P2 is better preserving objects boundaries as well as thin objects.

The adaptive P2 implemented in hardware may be defined as follows in some embodiments based on current and previous images:

$$P2' = \frac{1}{\alpha} \text{abs}(I_{cur} - I_{pre}) + P2.$$

To simplify the implementation, the a may be limited to certain values (e.g. 1, 2, 4, and 8).

In some embodiments, the SGM block implements subpixel interpolation. The SGM block may implement the equiangular subpixel interpolation, which yields a quality advantage compared to the well-known parabola interpolation. Equiangular subpixel interpolation can be determined as follows:

$$d_{SubPix} = \begin{cases} d_{Int} + \frac{c_{d+1} - c_{d-1}}{2 \times (c_d - c_{d-1})} & \text{if } c_{d+1} < c_{d-1} \\ d_{Int} + \frac{c_{d+1} - c_{d-1}}{2 \times (c_d - c_{d+1})} & \text{otherwise} \end{cases}$$

where $c_d$ is the minimum path cost, and $c_{d+1}/c_{d-1}$ are neighbor path costs, if any.

The OFA in some embodiments uses intermediate buffers for writing/reading temporary information that can't store in on-chip memory. There are two kinds of intermediate buffers that are used by the OFA: history buffer and temporary buffer. The history buffer is used to store path cost for every disparity/flow from previous pixel row. The temporary buffer is used to store intermediate winner/cost from previous SGM pass.

The minimum size for the history buffer may be determined as alignTo256B(output_width*output_height*(diagonal_enable?3:1)*(pydSGM?256:(disparities))), where alignTo256B is defined as alignTo256B(unsigned x){unsigned remainder=x % 256; return remainder==0 ? x: x-remainder+alignment;}. The minimum size for the temporary buffer may be determined as alignTo256B (output_width*output_height*(diagonal_enable?4:2)* (pydSGM?6:4)).

The OFA in some embodiments supports variable motion vector/disparity output granularity. In some embodiments, the motion vector granularity and/or disparity output granularity is controlled through a grid size parameter. The grid size can be configured to 1/2/4/8 in x and y direction independently. That is, (grid size x)/(grid size y) can be variably configured (e.g. ½, 1, 2, etc.) by changing grid size x and grid size y independently of each other. FIG. 8F is an illustration of grid size feature in the OFA for a grid size of 4×4, according to some embodiments. As shown in the figure, the output flow vector and or disparity for processing may be based upon a selected few of the pixels from the original pixels. The variable granularity feature enables example embodiments to selectively bias quality and performance.

Epipolar SGM Pipeline

Figure 9:
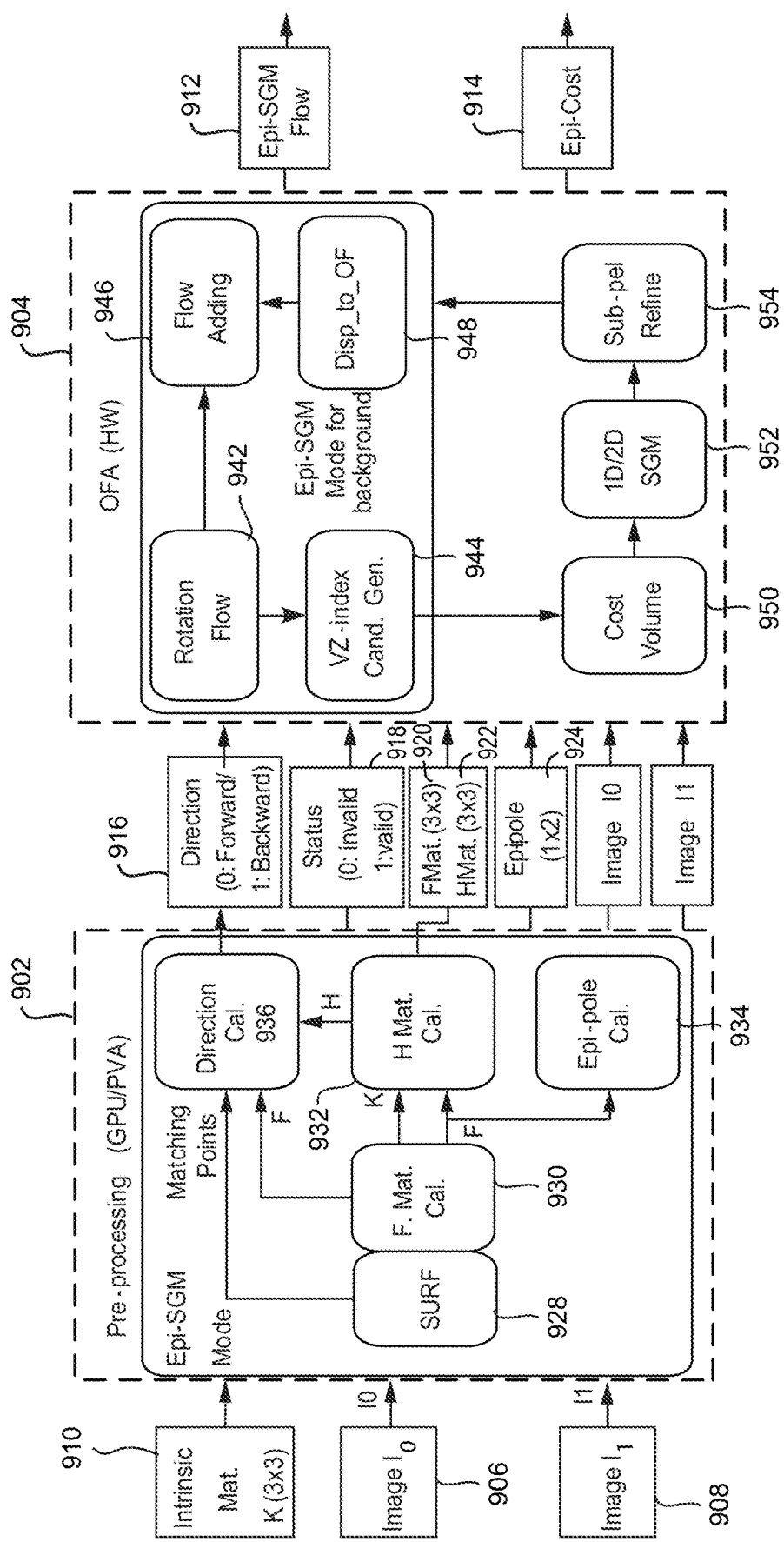
FIG. 9 illustrates a system pipeline for the epipolar SGM optical flow mode in a system such as the system shown in FIG. 1, according to some embodiments.

FIG. 9 illustrates a system pipeline for epipolar SGM optical flow mode in a system such as system 100, according to some embodiments.

The epipolar SGM system pipeline comprises a preprocessing stage 902 that may be performed by the GPU and/or another processor (e.g. a programmable vision accelerator (PVA)) external to the OFA, and an accelerated processing stage 904 that is performed in the OFA.

Epipolar SGM optical flow is based two view epipolar geometry. The epipolar geometry encodes the correspondence relationship between two images via the fundamental matrix. The fundamental matric F may be a 3×3 matrix such that l'=F×p and l=p'×F, where p and p' are points in left and right images respectively which corresponds to the epipolar relation that p maps to epipolar line l' and p' maps to epipolar line l. Therefore, it follows that p'Fp=0. Known techniques can be used to determine F from point correspondences. Basically the correspondence must lie on the corresponding epipolar lines, see example in FIG. 3B. The epipolar line calculation can be further simplified by using the fact that the motion is composed of two parts: motion that is only related to camera rotation, and motion that is only related to camera translation and pixel depth. Then, the relationship can be reformulated as: $p'=K'RK^{-1}p+K't/z$.

By using the epipolar constraint the optical flow problem is reduced from 2D search to 1D search, which reduces the computation dramatically. SGM is also used as regularization in this technique. A description of epipolar calculation can be found in K. Yamaguchi et al, "*Robust Monocular Epipolar Flow Estimation*", 2013 *IEEE Conference on Computer Vision and Pattern Recognition*, Portland, Oreg., 2013, pp. 1862-1869, which is hereby incorporated by reference.

An important note for OFA epiSGM mode is the preprocessing step (monocular geometry calculation) assumes the camera intrinsic is available. epiSGM provides for generalized stereo, without a rectification assumption (e.g. arbitrary camera positions).

The pre-processing stage 902 takes two input images $I_0$ 906 and $I_1$ 908 as input. The input may also include an intrinsic matrix K 910 (e.g. a 3×3 intrinsic matrix).

Preprocessing may include preliminary pre-processing such as, but not limited to, denoising and rectification. In the epipolar optical flow mode, the preprocessing stage 902 may include a matching point determining module 928 that determines matching points between the two input images, a fundamental matrix determining module 930 to calculate the fundamental matrix corresponding to the two input images, a flow direction determiner 936 that determined the direction of the flow based on matching points in the input images, a homography matrix determiner 932 which generates the homography associated with the input images, and an epipole determiner 934 that calculates the epipole(s) for the input images.

The matching point determining module 928 may use a feature detector such as, for example, the Speeded-Up Robust Features (SURF) feature descriptor (described in H. Bay, T. Tuytelaars, and L. V. Gool, "SURF: Speeded up robust features," in Proc. of the 9th European Conference on Computer Vision (ECCV'06), *ser. Lecture Notes in Computer Science*, A. Leonardis, H. Bischof, and A. Pinz, Eds., vol. 3951. Graz, Austria: SpringerVerlag, May 2006, pp. 404-417) to determine matching points between the two input images. In some embodiments, other feature descriptors, such as, but not limited to, the well-known Scale-Invariant Feature Transform (SIFT) can be used.

The accelerated processing stage 904 receives the flow direction 916 (e.g., 0-forward, 1-backward), status 918, the fundamental matrix 920, the homography matrix 922, epipole 924, and the two images 906 and 908 as input.

The OFA circuitry involved in processing in the epipolar optical flow mode includes several modules that are specific to the epipole mode, and several modules that are in common with one or more other operation modes of the OFA. The modules specific to the epipole mode include a rotation flow module 942, a flow adding module 940, a vz-index candidate generation and a disparity to optical flow module 948. The modules that are common with one or more other modes include a cost volume module 950, an SGM module 952 and a subpixel refining module 954.

In some embodiments, the epipole mode is primarily used for background of a scene.

In some embodiments, the RPF (e.g., RPF 414) may calculate the starting reference pixel location. The calculation may have two steps: rotation motion vector calculation and generating offsets along epipolar line. The rotation motion vector calculation may include the following: a first step of rotation $P_1(x,y,z)=H(3\times3)*P_0(x,y,1)$; a second step of normalization $P_1(x,y,1)=P_1(x,y,z)/z$; a third step of epipolar line calculation $L_2(x,y,z)=F(3\times3)*P_0(x,y,1)$; fourth through sixth steps of normalization by $S=L_2(x)^2+L_2(y)^2$, N=rsqrt (S), and $L_2(x,y,z)=L_2*N$; a seventh step of coefficient determination $C=L_2(x,y,z)*P_1(x,y,1)$; an eighth step of offset determination $O(x,y)=C*L_2(x,y)$; and a ninth step of final reference pixel determination $MV(x,y)=P_1(x,y)-P_0(x,y)-O(x,y)$. The offsets along epipolar line are calculated as following $$d(p, Z_p) = r' - r = r_1 \frac{\frac{v_z}{Z_p}}{1 - \frac{v_z}{Z_p}} = |p + u_w(p) - o'| \frac{\frac{v_z}{Z_p}}{1 - \frac{v_z}{Z_p}}$$

where $|p+u_w(p)-o'|$ is the pixel offset from epipole, and $v_z/Z_p$ is a variable that is only related to pixel depth.

$v_z/Z_p$ may be calculated in the SGM framework as:

$$\frac{v_z}{Z_p} = \frac{\omega_p}{n} v_{max}, \text{ with } \omega_p \in \{0, 1, 2, \ldots, n-1\}$$

where $v_{max}$ denotes the maximum possible value, n is the quantization levels, and $w_p$ is the v/z index.

In some embodiments, due to hardware implementation considerations, $v_{max}$ is fixed to 0.3, and n is fixed to 256, so $v_z/Z_p$ is a constant value for each disparity d:

$$\text{offset}(x,y) = \text{sign}*v(x,y)*TAB[d]$$

where v(x, y)=(x, y)+rotation_mv(x, y)−epipole.

After the processing of the input images in the OFA in epipolar mode, the OFA outputs an optical flow map (e.g., epi-SGM flow map) 912 and a cost map (e.g., an epi-cost map) 914. The pipeline may be configured to not generate the cost map 914.

Figure 10:
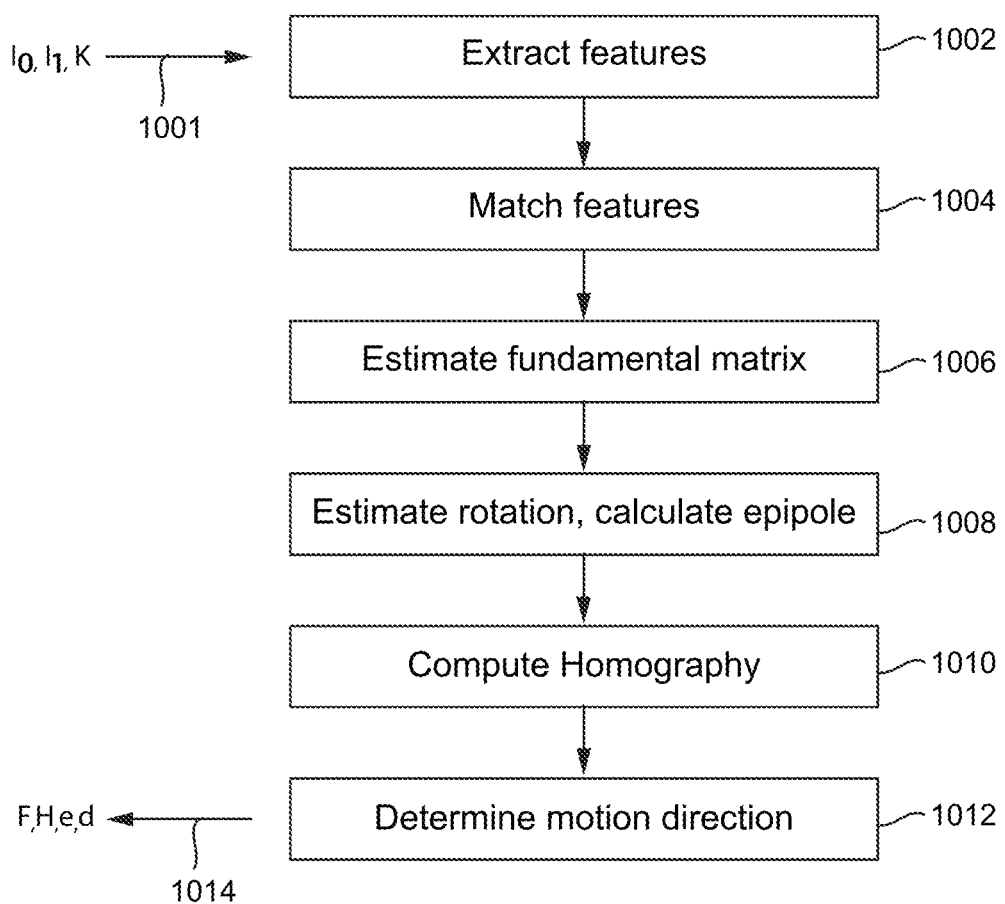
FIG. 10 illustrates a flowchart for a technique to generate the input to the OFA in an epipolar mode system pipeline, according to some example embodiments.

FIG. 10 illustrates a flowchart for a technique to generate the input to the OFA in the epipolar mode system pipeline, according to some example embodiments. For example, the process 1000 may be performed by the GPU (e.g. GPU 106) and/or another processor such as a PVA) in performing the operations described in relation to the preprocessing stage 902 in the epipolar SGM mode system pipeline.

After entering process 1000, the images are subjected to feature extraction at operation 1002. Operation 1002 takes as inputs 1001, the two input images $I_0$ 906 and $I_1$ 908 and the intrinsic matrix K 910 (e.g. a 3×3 intrinsic matrix).

At operation 1004, the extracted features are matched between the input images. The feature matching may rely upon the knowledge of camera intrinsic parameters as provided, for example in the intrinsic matrix.

At operation 1006, the fundamental matrix for the input images is generated. The fundamental matrix F may be determined based on the relationship $x'^T F x = 0$.

At operation 1008, rotation estimation and epipole calculation are performed. This may be performed using $E=K'FK$ yielding R and the epipole, relying upon the knowledge of camera intrinsic parameters as provided, for example in the intrinsic matrix K.

At operation 1010, the homography matrix is calculated. The following relationship may be utilized $H=KRK'$.

At operation 1012, the motion direction is determined.

After operation 1012, the outputs 1014 are provided to the OFA. The outputs 1014 include the fundamental matrix F, the homography H, epipole information e and d.

Pyramidal SGM Pipeline

Figure 11:
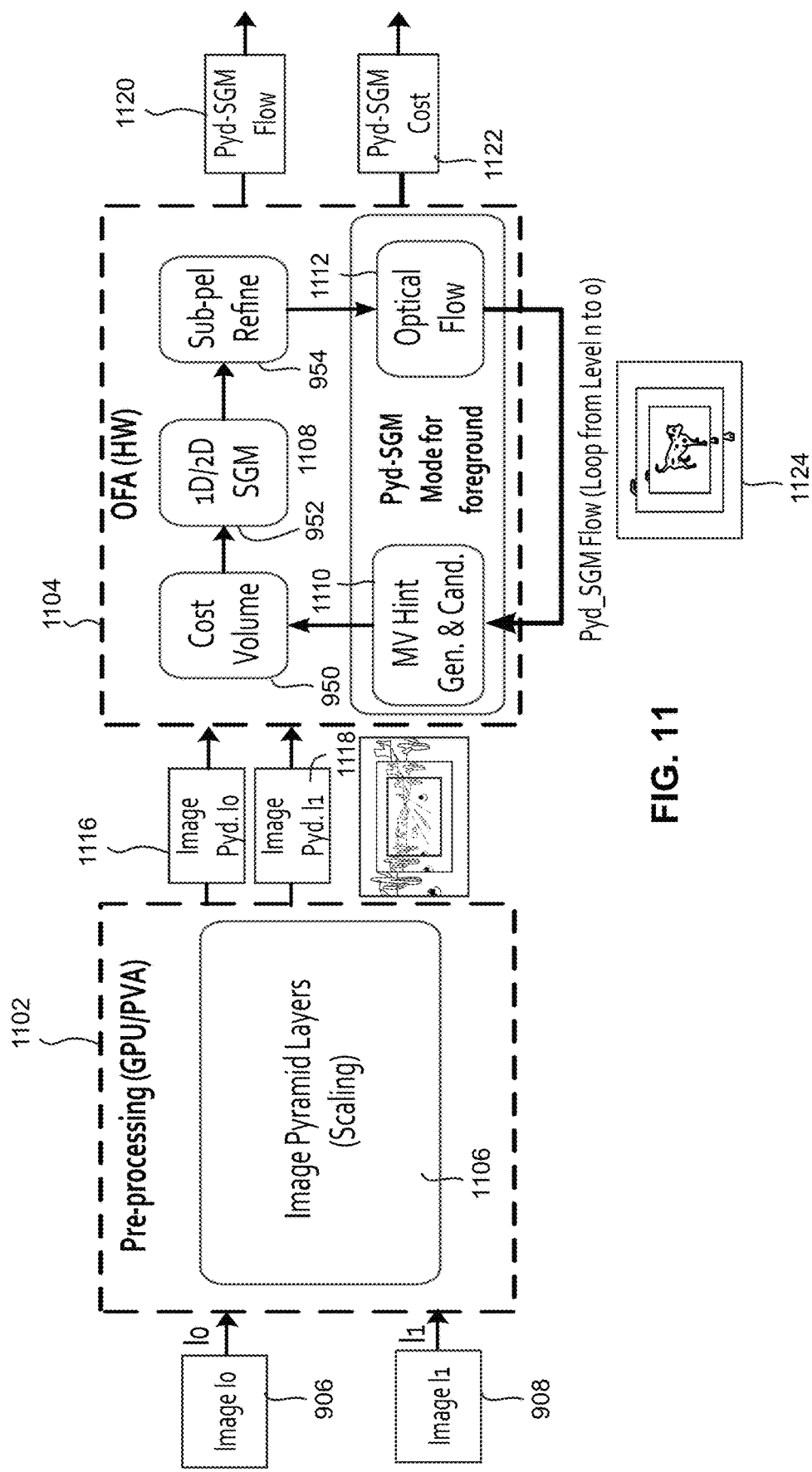
FIG. 11 illustrates a system pipeline for the pyramid SGM optical flow mode in a system such as the system in FIG. 1, according to some embodiments.

FIG. 11 illustrates a system pipeline for pyramid SGM optical flow mode in a system such as system 100, according to some embodiments.

The pyramid SGM system pipeline comprises a pre-processing stage 1102 that may be performed by the GPU and/or another processor (e.g. a programmable vision accelerator (PVA)) external to the OFA, and an accelerated processing stage 1104 that is performed in the OFA. In contrast to the epipolar SGM pipeline, the pyramidal SGM pipeline in the 2D case does not require geometric information (e.g. intrinsic parameters of the cameras). As noted above, the pyramidal SGM is used in example embodiments to more accurately capture large motion.

Pyramidal SGM is a generalization of stereo SGM from 1D to 2D space. It is a generic optical flow method and doesn't require any geometric information (epipolar geometry). because of the search range for a single layer is small (e.g., 23×11 pixels in OFA's implementation), pyramidal approach is required to deal with large motion, basically each level will search around the result from previous level. FIG. 4: shows such process.

The pre-processing stage 1102 takes two input images $I_0$ 906 and $I_1$ 908 as input.

The preprocessing stage 1102 includes an image pyramid generation module 1106 that generates image pyramids for each of the input images. The pyramid generation may use CUDA to generate an image pyramid using, for example, a 5×5 Gaussian kernel. An image pyramid comprises a set of layers in which the higher the smaller the size. Each layer is numbered from bottom to top, so layer i+1 is smaller than layer i. To generate layer i+1 in the Gaussian pyramid, layer i may be convolved with a Gaussian kernel, and remove every even-numbered row and column from the result. An example Gaussian kernel convolution may be as follows:

$$\frac{1}{16}\begin{bmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{bmatrix}$$

In some embodiments, the OFA may include a scaler for generating the image. For example, such a hardware-based scaler can generate a pyramid which uses a smaller 3×3 Gaussian kernel to minimize the use of chip real estate.

The generated image pyramids, image pyramid for images 1116 and image pyramid for image 1118 are then provided as input to the OFA stage 1104 in the pyramid SGM mode.

In addition to the OFA circuitry such as cost volume constructor 950, 1D/2D SGM 952 and subpixel refine module 954, the OFA circuitry includes pyramid SGM mode specific modules such as an optical flow module 1112 and a motion vector hint generation and candidate generation module 1110. The output from the subpixel refinement is provided to the optical flow module 1112, and the output from the hint module 1110 is provided to the cost volume constructor 950. The operations in the OFA may be looped for each level of the image pyramid.

In pyramidal mode, the ref pixel position is provided directly by an input hint motion vector which from previous image level or other sources. OFA supports a fixed 23×11 search window as illustrated in FIG. 8C.

After the processing in the OFA, a pyramid SGM flow 1120 and a pyramid SGM cost 1122 are output. The pipeline may be configured to not generate the cost 1122.

Stereo Disparity Pipeline

Figure 12:
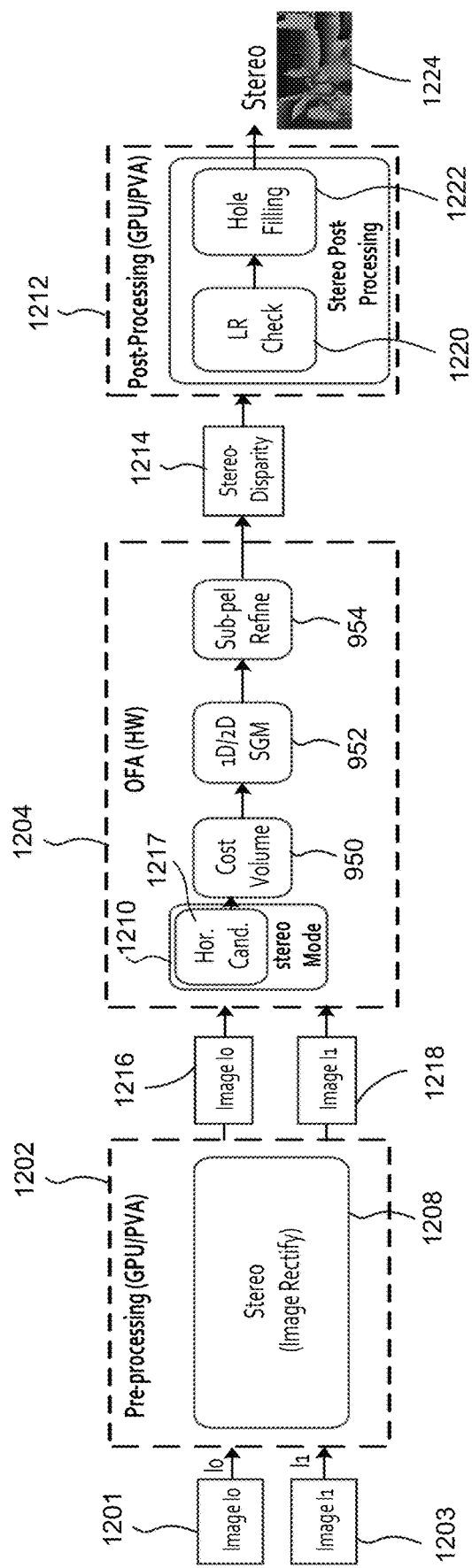
FIG. 12 illustrates a system pipeline for the stereo mode in a system such as the system in FIG. 1, according to some embodiments.

FIG. 12 illustrates a system pipeline for stereo mode in a system such as system 100, according to some embodiments.

The stereo SGM system pipeline comprises a pre-processing stage 1202 that may be performed by the GPU and/or another processor (e.g. a programmable vision accelerator (PVA)) external to the OFA, an accelerated processing stage 1104 that is performed in the OFA, and a postprocessing stage 1212 that may also be performed in a GPU or other processor.

The pre-processing stage 1202 takes two input images $I_0$ 1201 and $I_1$ 1203 as input. The preprocessing stage 1202 includes a stereo image rectification module 1208 that rectifies each of the input images as necessary. The rectified images, $I_0$ 1216 and $I_1$ 1218 are then provided as input to the OFA stage 1204 in the stereo SGM mode.

In addition to the OFA circuitry such as cost volume constructor 950, 1D/2D SGM 952 and subpixel refinement module 954, the OFA circuitry includes stereo SGM mode specific modules such as horizontal candidate selection module 1217.

In stereo mode, the search direction is always horizontal, a sign flag provided from software is used to determine the search direction (search from left→right or right→left).

After the processing in the OFA, a stereo disparity map corresponding to the input images 1201 and 1203 is provided to the post processing stage 1212.

The postprocessing stage 1212 includes a LR check module 1220 for performing left to right confirmation and a hole filling module 1222 to. The output of the system includes a stereo disparity map 1224.

Fusion Optical Flow Pipeline

Figure 13:
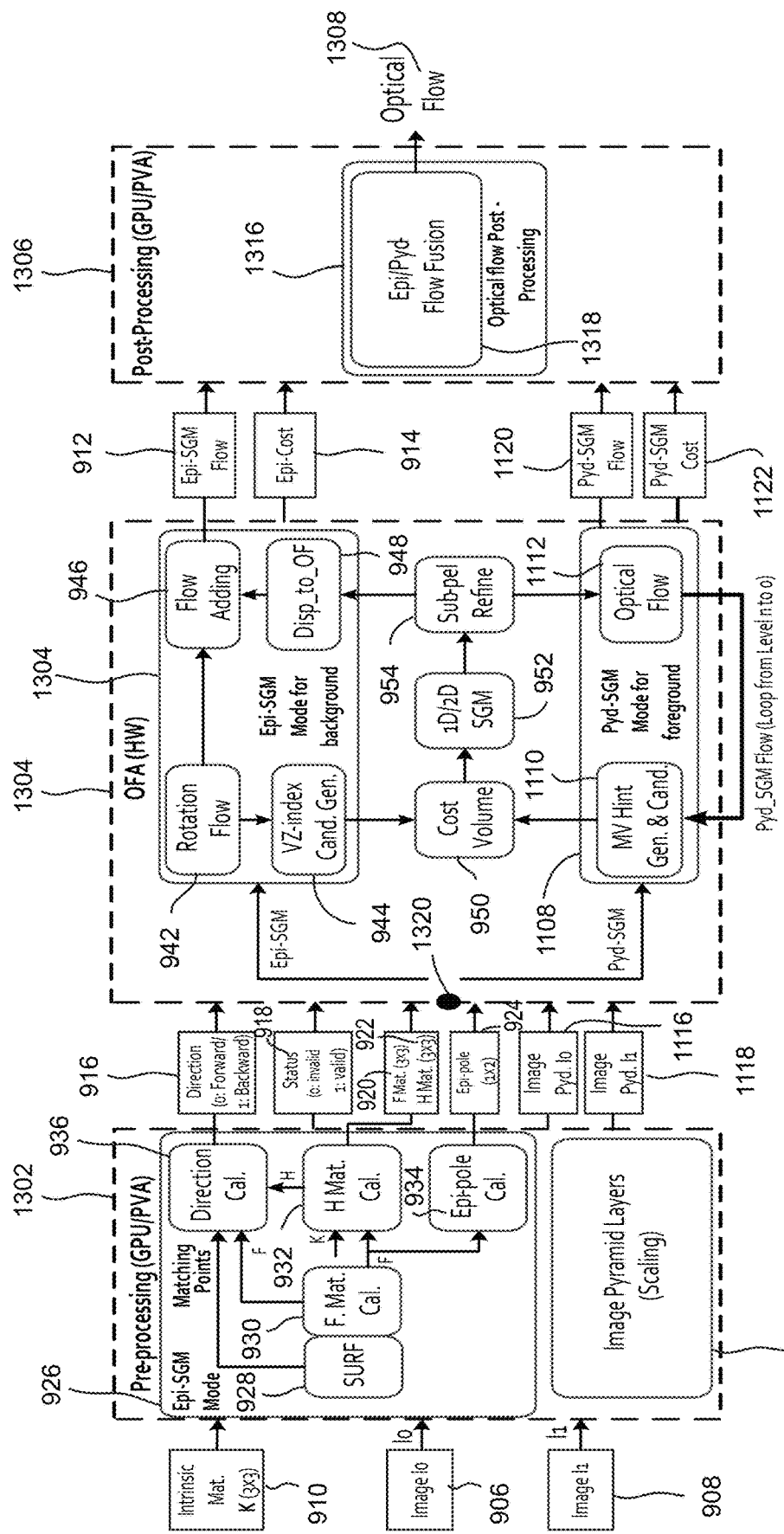
FIG. 13 illustrates a system pipeline for fusion SGM optical flow mode in a system such as the system in FIG. 1, according to some embodiments.

FIG. 13 illustrates a system pipeline for fusion SGM optical flow mode in a system such as system 100, according to some embodiments.

In the fusion mode, the system 100 utilizes both the epipolar SGM mode system pipeline stages shown in FIG. 9 and the pyramid SGM mode system pipeline shown in FIG. 11. Accordingly, the preprocessing stage 1302 of the fusion mode, that may be performed by the GPU and/or another processor (e.g. a programmable vision accelerator (PVA)) external to the OFA, includes the modules of the epipolar SGM mode pre-processing stage 902 and the modules of the pyramid SGM preprocessing stage 1102.

The output from the fusion mode preprocessing stage 1302 may include the outputs described above as outputs of the epipolar mode preprocessing stage 902 and the outputs of the pyramid SGM mode preprocessing 1102. The outputs from the preprocessing stage are provided as inputs to the fusion mode accelerated processing stage 1304 in the OFA.

In fusion SGM mode, the OFA modules for epipolar mode (e.g. modules 942, 944, 946 and 948), modules for pyramid mode (e.g. 1110 and 1112) and the common modules (e.g. 950, 952 and 954) are activated.

In some embodiments, the OFA may include a switch 1320 to selectively activate the epipolar SGM system pipeline or the pyramid SGM system pipeline. The switch may be used to sequentially run the input images $I_0$ 906 and $I_1$ 908 through the epipolar SGM pipeline and the pyramid SGM pipeline and to provide the outputs from each to the fusion mode postprocessing stage 1306. Sequentially performing the epipolar SGM and the pyramid SGM in the OFA enables the use of common circuitry (and thus saving space on the chip) for cost volume construction (e.g. module 950), SGM (e.g. module 952) and subpixel refinement (e.g. module 954) without complex pipelining.

In some other embodiments, the OFA may be configured to process the input images $I_0$ 906 and $I_1$ 908 in parallel through the epipolar SGM pipeline and the pyramid SGM pipeline and to provide the outputs from each to the fusion mode postprocessing stage 1306. In such embodiments, the common circuitry may be duplicated and/or a pipeline may be used for staging the common processing of both modes in an efficient manner to achieve real time optical flow.

The fusion mode postprocessing stage 1306 takes as input the epipolar SGM flow map 912, the epipolar SGM cost map 914, the pyramid SGM flow map 1120, and the pyramid SGM cost map 1122 as input and performs optical flow postprocessing 1316 to generate an optical flow 1308.

The optical flow 1308 is generated by a epipolar and pyramid flow fusion module 1318 that obtains the background of optical flow 1308 based entirely, or substantially entirely, on the inputs from the OFA's epipolar mode and obtains the foreground of optical flow 1308 based entirely, or substantially entirely, on the inputs from the OFA's pyramid mode.

The fusion may be based on fusing the generated flow maps using the corresponding cost maps. In some embodiments, a technique such as cost-based WTA or cost-based segmentation may be used for the fusion.

In some embodiments, the background and foreground separation and/or identification for fusion may be based on simple motion-based analysis. For images obtained from static cameras, the optical flow map may be analyzed for presence and location of activity. Bounding boxes for identified objects may be obtained by a process that includes flow magnitude determination, adaptive thresholding, morphological close/open, blob analysis, small blob removal, boxing boxes, and merging boxes. In another approach, the simple motion-based analysis may be based on egomotion compensation which helps detect moving objects. The steps in such a process may include determining epipolar flow based on $I_0$ to $I_1$, warping $I_1$, calculating the difference between $I_0$ and warped $I_1$, and then filtering and thresholding for segmentation. Yet another approach may be based on identifying intermediate obstacle/object representation based on stereo depth. The steps may include, determining stereo disparity, determining the occupancy grid, determining free space, determining height segmentation, and then determining stixels. Stixel clusters form object candidates, which can then distinguish objects. Another approach to identifying foreground objects may be based on that may be used in embodiments is described in Geiger, et al, "Bounding Boxes, Segmentations and Object Coordinates How Important is Recognition for 3D Scene Flow Estimation in Autonomous Driving Scenarios", *International Conference on Computer Vision (ICCV)* 2017, which is hereby incorporated by reference in its entirety. Geiger et al. describes that, given stereo image pairs at t1 and t0, 3D points (XYZ) can be computed for each pixel. For each of the four input images, XYZ image-blocks, instance segmentations are obtained, alongside bounding boxes. The instances are processed individually to obtain object coordinates for each instance, using an object coordinates convolution neural network (CNN). Thereafter, as described in Geiger et al. the obtained information is integrated into an Instance Scene Flow method (ISF) to produce the final output.

The output of the fusion may include an optical flow in which the foreground is based on pyramidal SGM and the background is based on epipolar SGM, and the corresponding segmentation map.

The OFA in an Example Application

Figure 14A:
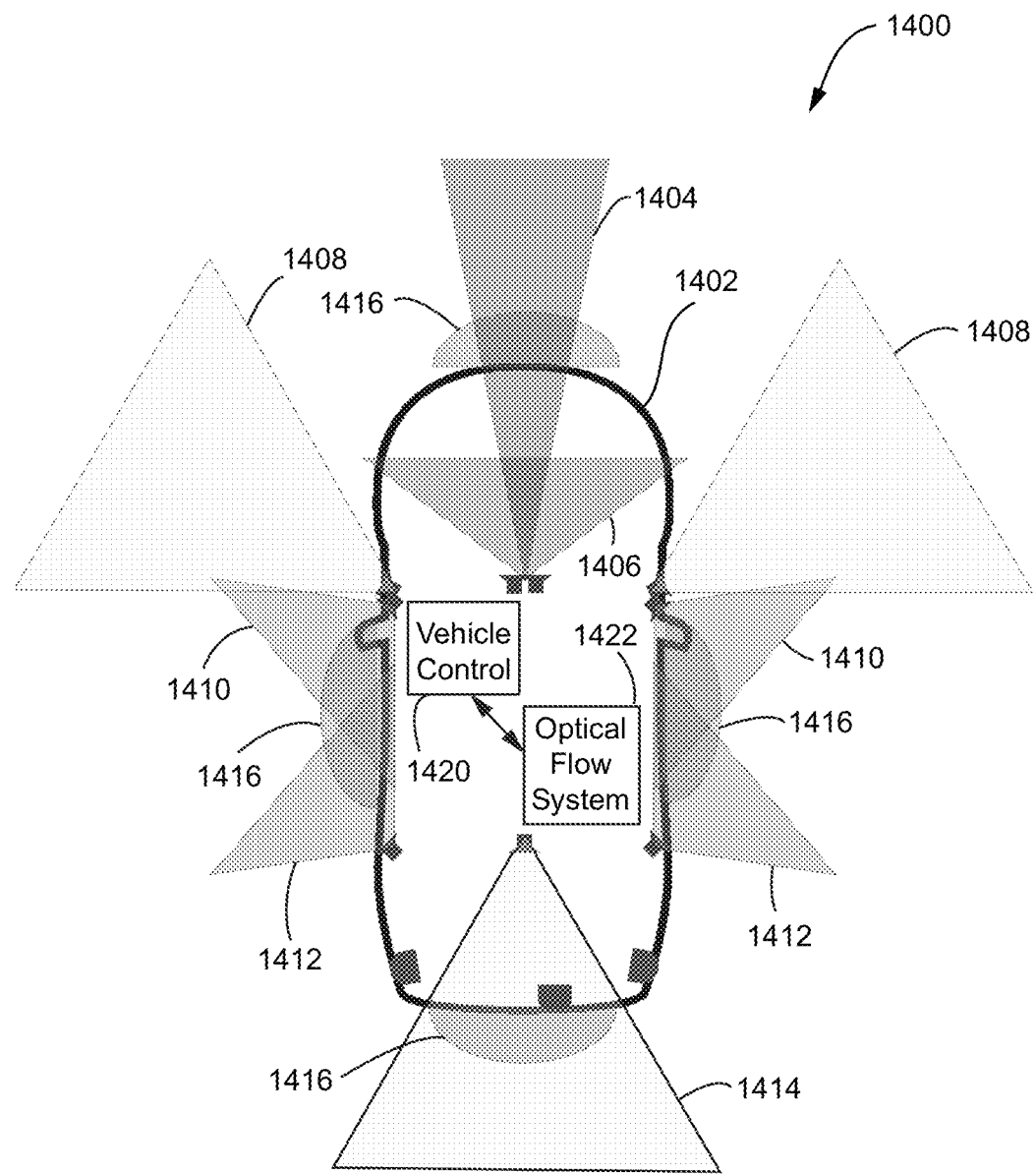
FIG. 14A schematically illustrates a system, such as the system in FIG. 1, including an OFA, incorporated into an automotive application according to some embodiments.

FIG. 14A schematically illustrates a system 1400 in which a vehicle 1402 incorporates an OFA, such as OFA 400, to accelerate optical flow for use in an application such as an ADAS application.

The optical flow system 1422 may be a system such as system 100 described above, and may be configured to receive video from several (e.g. 13) cameras affixed to the vehicle 1402, and provide accelerated optical flow information, video inference using accelerated optical flow information, and/or other information as input to the vehicle control system 1420.

Each of the cameras may output video at 30 frames per second. The cameras may include one front camera (e.g. 12.0 megapixel camera) provides a 30 degree field of view 1404 of the front, one front camera (e.g. 12.0 megapixel camera) providing a 120 degree field of view 1406, two side cameras (e.g. 1.2 megapixel cameras) each having a 100 degree field of view 1410, two side blade cameras (e.g. 1.2 megapixel cameras) each having a 100 degree field of view 1412, two cross traffic cameras (e.g. 8.3 megapixel cameras) each having a 120 degree field of view 1408, one rear cameras (e.g. 2.3 megapixel camera) having a 50 degree field of view 1414, and four surround cameras (e.g. 1.2 megapixel cameras) each having a 190 degree field of view 1416.

The field of view 1404 may be processed for distance sight, small objects and lower amount of motion. The field of view 1408 may be processed for near/intermediate sight and high magnitude motion. The fields of view 1406 and 1410 may be processed for near sight and high magnitude motion, and field of view 1414 may be processed for near/intermediate sight and high magnitude motion.

In some applications, the video from all cameras may be used for optical flow. In some other applications the video from some cameras may not be used for optical flow. For example, in one application, the fields of view 1416 are excluded from the optical flow calculations.

Figure 14B:
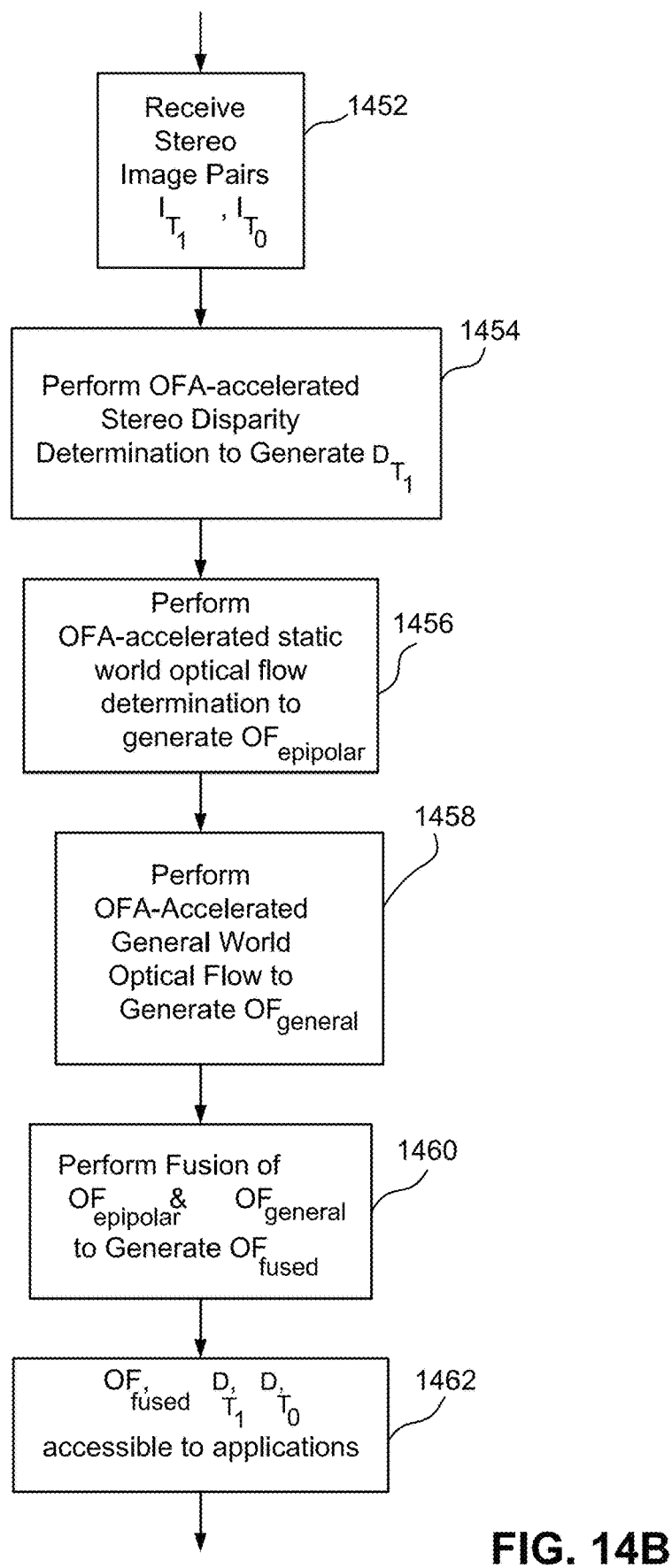
FIG. 14B is a flowchart for a process utilizing hardware-accelerated optical flow and stereo disparity generation, according to some embodiments.

FIG. 14B is a flowchart for a process 1450 utilizing hardware-accelerated optical flow and stereo disparity generation, according to some embodiments.

The illustrated portion of the process 1450 starts with the receiving of the stereo image pair $I_{t1}$ (left and right stereo images at time t1) at operation 1452. It is assumed that the image pair $I_{t1}$ follows image pair $I_{t0}$ (left and right stereo images at time t0), or that the two image pairs are received together.

At operation 1454, the image pair $I_{t1}$ may be processed to determine the stereo disparity for the pair. For example, the image pair $I_{t1}$ may be processed in the stereo SGM pipeline shown in FIG. 12. The pipeline generates a stereo disparity $D_{t1}$ for the image pair $I^{t1}$.

At operation 1456, static world optical flow determination is performed using, for example, the epipolar SGM pipeline shown in FIGS. 9 and 10 to generate the epipolar optical flow ($OF_{epipolar}$) from $I_{t0}$ to $I_{t1}$. The input to the epipolar SGM pipeline is provided from the image pairs $I_{t0}$ and $I_{t1}$.

At operation 1458, general optical flow determination is performed using, for example, the pyramidal SGM pipeline shown in FIG. 11 to generate the general/pyramidal optical flow ($OF_{general}$) from $I_{t0}$ to $I_{t1}$. The input to the general SGM pipeline is provided from the image pairs $I_{t0}$ and $I_{t1}$.

At operation 1460, the generated epipolar optical flow $OF_{epipolar}$ and the general optical flow $OF_{general}$, are combined to generate a fused optical flow $OF_{fused}$ as described in relation to the fused optical flow pipeline in FIG. 13.

At this point, at least optical flow information and stereo disparity information that are derived from the image pairs have been obtained. Then, at 1462, this information including the fused optical flow $OF_{fused}$, the disparity for time t1 $D_{t1}$ and the disparity for time t0 $D_{t0}$ are available for accessing by a processor for use in an application such as, for example, autonomous vehicle navigation. In some embodiments, the optical flow and the disparity information may be made available to application as a scene flow map in which, for each pixel, the value of the optical flow field is specified along with the disparity at the time steps t1 and t0.

Parallel Processing Architectures Incorporating the OFA

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 15:
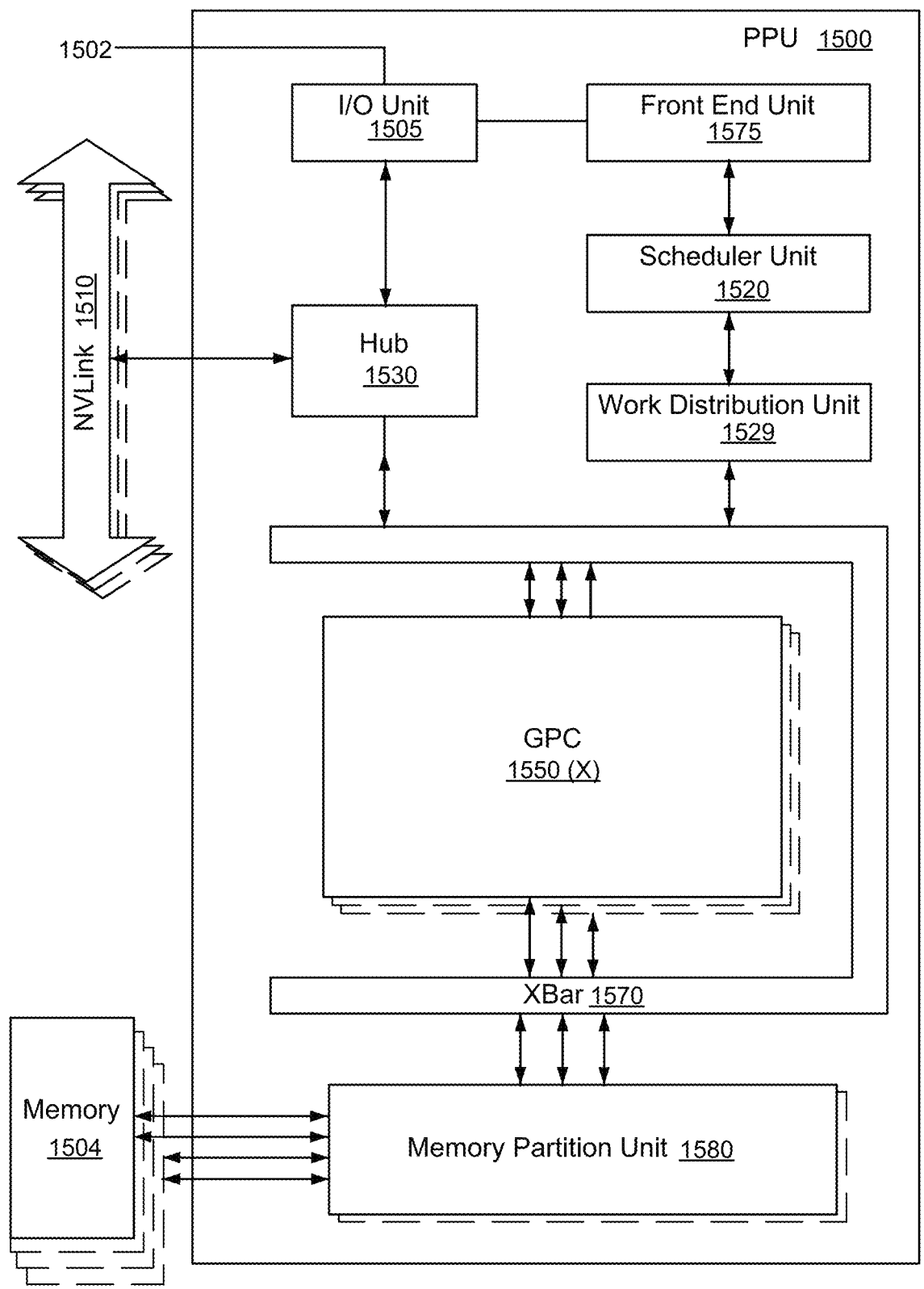
FIG. 15 illustrates a parallel processing unit that may be in a system shown in FIG. 1, in accordance with an embodiment.

FIG. 15 illustrates a parallel processing unit (PPU) 1500, which may be interconnected with one or more other PPUs or other devices over a switch 1500 according to some example embodiments. According to some embodiments, the GPU 106 described in relation to FIG. 1 is a PPU such as PPU 1500. In an embodiment, the PPU 1500 is a multi-threaded processor that is implemented on one or more integrated circuit devices. The PPU 1500 is a latency hiding architecture designed to process many threads in parallel. A thread (e.g., a thread of execution) is an instantiation of a set of instructions configured to be executed by the PPU 1500. In an embodiment, the PPU 1500 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 1500 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 1500 may be configured to accelerate thousands of High Performance Computing (HPC), data center, and machine learning applications. The PPU 1500 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 51, the PPU 1500 includes an Input/Output (I/O) unit 1505, a front end unit 1515, a scheduler unit 1520, a work distribution unit 1525, a hub 1530, a crossbar (Xbar) 1570, one or more general processing clusters (GPCs) 1550, and one or more partition units 1580. The PPU 1500 may be connected to a host processor or other PPUs 1500 via one or more high-speed NVLink 1510 interconnect. The PPU 1500 may be connected to a host processor or other peripheral devices via an interconnect 1502. The PPU 1500 may also be connected to a local memory comprising a number of memory devices 1504. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 1510 interconnect enables systems to scale and include one or more PPUs 1500 combined with one or more CPUs, supports cache coherence between the PPUs 1500 and CPUs, and CPU mastering. Data and/or commands may be transmitted by the NVLink 1510 through the hub 1530 to/from other units of the PPU 1500 such as one or more copy engines, a video encoder, a video decoder, a power management unit, etc. (not explicitly shown). The NVLink 1510 is described in more detail in conjunction with FIGS. 16A-B.

The I/O unit 1505 is configured to transmit and receive communications (e.g., commands, data, etc.) from a host processor (not shown) over the interconnect 1502. The I/O unit 1505 may communicate with the host processor directly via the interconnect 1502 or through one or more intermediate devices such as a memory bridge. In an embodiment, the I/O unit 1505 may communicate with one or more other processors, such as one or more of the PPUs 1500 via the interconnect 1502. In an embodiment, the I/O unit 1505 implements a Peripheral Component Interconnect Express (PCIe) interface for communications over a PCIe bus and the interconnect 1502 is a PCIe bus. In alternative embodiments, the I/O unit 1505 may implement other types of well-known interfaces for communicating with external devices.

The I/O unit 1505 decodes packets received via the interconnect 1502. In an embodiment, the packets represent commands configured to cause the PPU 1500 to perform various operations. The I/O unit 1505 transmits the decoded commands to various other units of the PPU 1500 as the commands may specify. For example, some commands may be transmitted to the front end unit 1515. Other commands may be transmitted to the hub 1530 or other units of the PPU 1500 such as one or more copy engines, a video encoder, a video decoder, a power management unit, etc. (not explicitly shown). In other words, the I/O unit 1505 is configured to route communications between and among the various logical units of the PPU 1500.

In an embodiment, a program executed by the host processor encodes a command stream in a buffer that provides workloads to the PPU 1500 for processing. A workload may comprise several instructions and data to be processed by those instructions. The buffer is a region in a memory that is accessible (e.g., read/write) by both the host processor and the PPU 1500. For example, the I/O unit 1505 may be configured to access the buffer in a system memory connected to the interconnect 1502 via memory requests transmitted over the interconnect 1502. In an embodiment, the host processor writes the command stream to the buffer and then transmits a pointer to the start of the command stream to the PPU 1500. The front end unit 1515 receives pointers to one or more command streams. The front end unit 1515 manages the one or more streams, reading commands from the streams and forwarding commands to the various units of the PPU 1500.

The front end unit 1515 is coupled to a scheduler unit 1520 that configures the various GPCs 1550 to process tasks defined by the one or more streams. The scheduler unit 1520 is configured to track state information related to the various tasks managed by the scheduler unit 1520. The state may indicate which GPC 1550 a task is assigned to, whether the task is active or inactive, a priority level associated with the task, and so forth. The scheduler unit 1520 manages the execution of a plurality of tasks on the one or more GPCs 1550.

The scheduler unit 1520 is coupled to a work distribution unit 1525 that is configured to dispatch tasks for execution on the GPCs 1550. The work distribution unit 1525 may track a number of scheduled tasks received from the scheduler unit 1520. In an embodiment, the work distribution unit 1525 manages a pending task pool and an active task pool for each of the GPCs 1550. The pending task pool may comprise a number of slots (e.g., 32 slots) that contain tasks assigned to be processed by a particular GPC 1550. The active task pool may comprise a number of slots (e.g., 4 slots) for tasks that are actively being processed by the GPCs 1550. As a GPC 1550 finishes the execution of a task, that task is evicted from the active task pool for the GPC 1550 and one of the other tasks from the pending task pool is selected and scheduled for execution on the GPC 1550. If an active task has been idle on the GPC 1550, such as while waiting for a data dependency to be resolved, then the active task may be evicted from the GPC 1550 and returned to the pending task pool while another task in the pending task pool is selected and scheduled for execution on the GPC 1550.

The work distribution unit 1525 communicates with the one or more GPCs 1550 via XBar 1570. The XBar 1570 is an interconnect network that couples many of the units of the PPU 1500 to other units of the PPU 1500. For example, the XBar 1570 may be configured to couple the work distribution unit 1525 to a particular GPC 1550. Although not shown explicitly, one or more other units of the PPU 1500 may also be connected to the XBar 1570 via the hub 1530.

The tasks are managed by the scheduler unit 1520 and dispatched to a GPC 1550 by the work distribution unit 1525. The GPC 1550 is configured to process the task and generate results. The results may be consumed by other tasks within the GPC 1550, routed to a different GPC 1550 via the XBar 1570, or stored in the memory 1504. The results can be written to the memory 1504 via the partition units 1580, which implement a memory interface for reading and writing data to/from the memory 1504. The results can be transmitted to another PPU 1504 or CPU via the NVLink 1510. In an embodiment, the PPU 1500 includes a number U of partition units 1580 that is equal to the number of separate and distinct memory devices 904 coupled to the PPU 1500. A memory management unit (MMU) provides an interface between the GPC 1550 and the partition unit 1580. The MMU may provide translation of virtual addresses into physical addresses, memory protection, and arbitration of memory requests.

The memory partition unit 1580 may include a Raster Operations (ROP) unit, a level two (L2) cache, and a memory interface. The memory interface is coupled to the memory 1504. The memory interface may implement 32, 64, 128, 1024-bit data buses, or the like, for high-speed data transfer. In an embodiment, the PPU 1500 incorporates U memory interfaces, one memory interface per pair of partition units 1580, where each pair of partition units 1580 is connected to a corresponding memory device 1504. For example, PPU 1500 may be connected to up to Y memory devices 1504, such as high bandwidth memory stacks or graphics double-data-rate, version 5, synchronous dynamic random access memory, or other types of persistent storage.

In an embodiment, the memory interface implements an HBM2 memory interface and Y equals half U. In an embodiment, the HBM2 memory stacks are located on the same physical package as the PPU 1500, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1504 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 1500 process very large datasets and/or run applications for extended periods.

In an embodiment, the PPU 1500 implements a multi-level memory hierarchy. In an embodiment, the memory partition unit 1580 supports a unified memory to provide a single unified virtual address space for CPU and PPU 1500 memory, enabling data sharing between virtual memory systems. In an embodiment the frequency of accesses by a PPU 1500 to memory located on other processors is traced to ensure that memory pages are moved to the physical memory of the PPU 1500 that is accessing the pages more frequently. In an embodiment, the NVLink 1510 supports address translation services allowing the PPU 1500 to directly access a CPU's page tables and providing full access to CPU memory by the PPU 1500.

In an embodiment, copy engines transfer data between multiple PPUs 1500 or between PPUs 1500 and CPUs. The copy engines can generate page faults for addresses that are not mapped into the page tables. The memory partition unit 1580 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1504 or other system memory may be fetched by the memory partition unit 1580 and stored in the L2 cache, which is located on-chip and is shared between the various GPCs 1550. As shown, each memory partition unit 1580 includes a portion of the L2 cache associated with a corresponding memory device 1504. Lower level caches may then be implemented in various units within the GPCs 950. For example, each of the streaming multiprocessors (SMs) in the GPC may implement a level one (L1) cache. The L1 cache is private memory that is dedicated to a particular SM. Data from the L2 cache may be fetched and stored in each of the L1 caches for processing in the functional units of the SMs. The L2 cache is coupled to the memory interface and the XBar 1570.

In an embodiment, a host processor executes a driver kernel that implements an application programming interface (API) that enables one or more applications executing on the host processor to schedule operations for execution on the PPU 1500. In an embodiment, multiple compute applications are simultaneously executed by the PPU 1500 and the PPU 1500 provides isolation, quality of service (QoS), and independent address spaces for the multiple compute applications. An application may generate instructions (e.g., API calls) that cause the driver kernel to generate one or more tasks for execution by the PPU 1500. The driver kernel outputs tasks to one or more streams being processed by the PPU 1500. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory.

The PPU 1500 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 1500 is embodied on a single semiconductor substrate. In another embodiment, the PPU 1500 is included in a system-on-a-chip (SoC) along with one or more other devices such as additional PPUs 1500, the memory 1504, a reduced instruction set computer (RISC) CPU, a memory management unit (MMU), a digital-to-analog converter (DAC), and the like.

In an embodiment, the PPU 1500 may be included on a graphics card that includes one or more memory devices 1504. The graphics card may be configured to interface with a PCIe slot on a motherboard of a desktop computer. In yet another embodiment, the PPU 1500 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 16A:
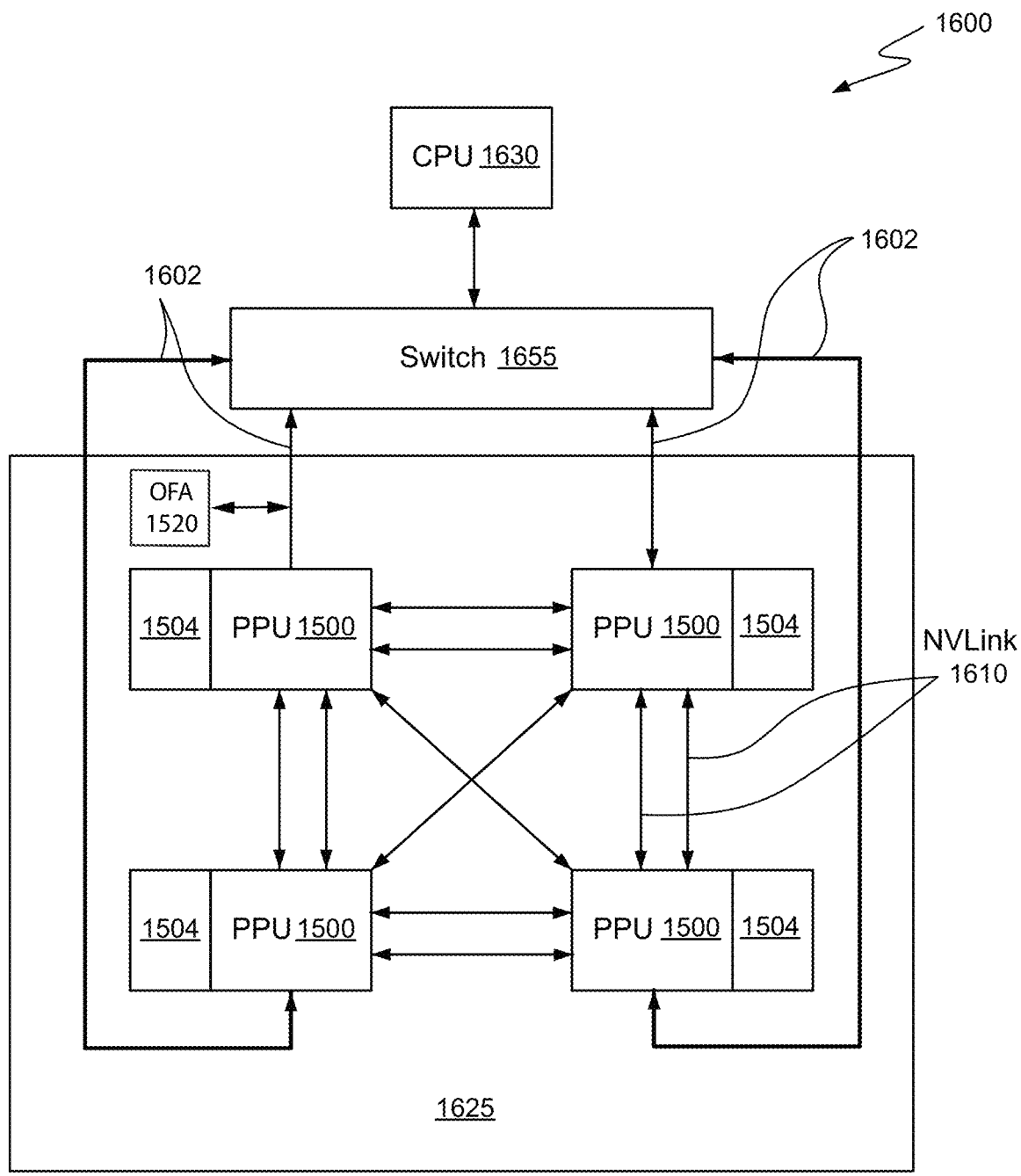
FIG. 16A is a conceptual diagram of a processing system implemented using the parallel processing unit (PPU) of FIG. 15 and an optical flow accelerator (OFA) of FIG. 4, in accordance with an embodiment.

FIG. 16A is a conceptual diagram of a processing system 1600 implemented using the PPU 1500 of FIG. 15, in accordance with an embodiment. The processing system 1600 includes a CPU 1630, switch 1655, and multiple PPUs 1500 each and respective memories 1504. The NVLink 1610 provides high-speed communication links between each of the PPUs 1500. Although a particular number of NVLink 1610 and interconnect 1002 (which may also be NVLINK) connections are illustrated in FIG. 16A, the number of connections to each PPU 1500 and the CPU 1630 may vary. The switch 1655 interfaces between the interconnect 1602 and the CPU 1630. The PPUs 1500, memories 1504, and NVLinks 1610 may be situated on a single semiconductor platform to form a parallel processing module 1625. The processing module 1625 may also include an OFA, such as OFA 400 described above, that is connected directly or indirectly to one or more of the PPU and switch 1655. In an embodiment, the switch 1655 supports two or more protocols to interface between various different connections and/or links.

In another embodiment, the NVLink 1610 provides one or more high-speed communication links between each of the PPUs 1500 and the CPU 1630 and the switch 1655 interfaces between the interconnect 1602 and each of the PPUs 1500. The PPUs 1500, memories 1504, and interconnect 1602 may be situated on a single semiconductor platform to form a parallel processing module 1625. In yet another embodiment, the interconnect 1602 provides one or more communication links between each of the PPUs 1500 and the CPU 1630 and the switch 1655 interfaces between each of the PPUs 1500 using the NVLink 1610 to provide one or more high-speed communication links between the PPUs 1500. In another embodiment, the NVLink 1610 provides one or more high-speed communication links between the PPUs 1500 and the CPU 1630 through the switch 1655. In yet another embodiment, the interconnect 1602 provides one or more communication links between each of the PPUs 1500 directly. One or more of the NVLink 1610 high-speed communication links may be implemented as a physical NVLink interconnect or either an on-chip or on-die interconnect using the same protocol as the NVLink 1610.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1625 may be implemented as a circuit board substrate and each of the PPUs 1500 and/or memories 1504 may be packaged devices. In an embodiment, the CPU 1630, switch 1655, and the parallel processing module 1625 are situated on a single semiconductor platform.

Figure 16B:
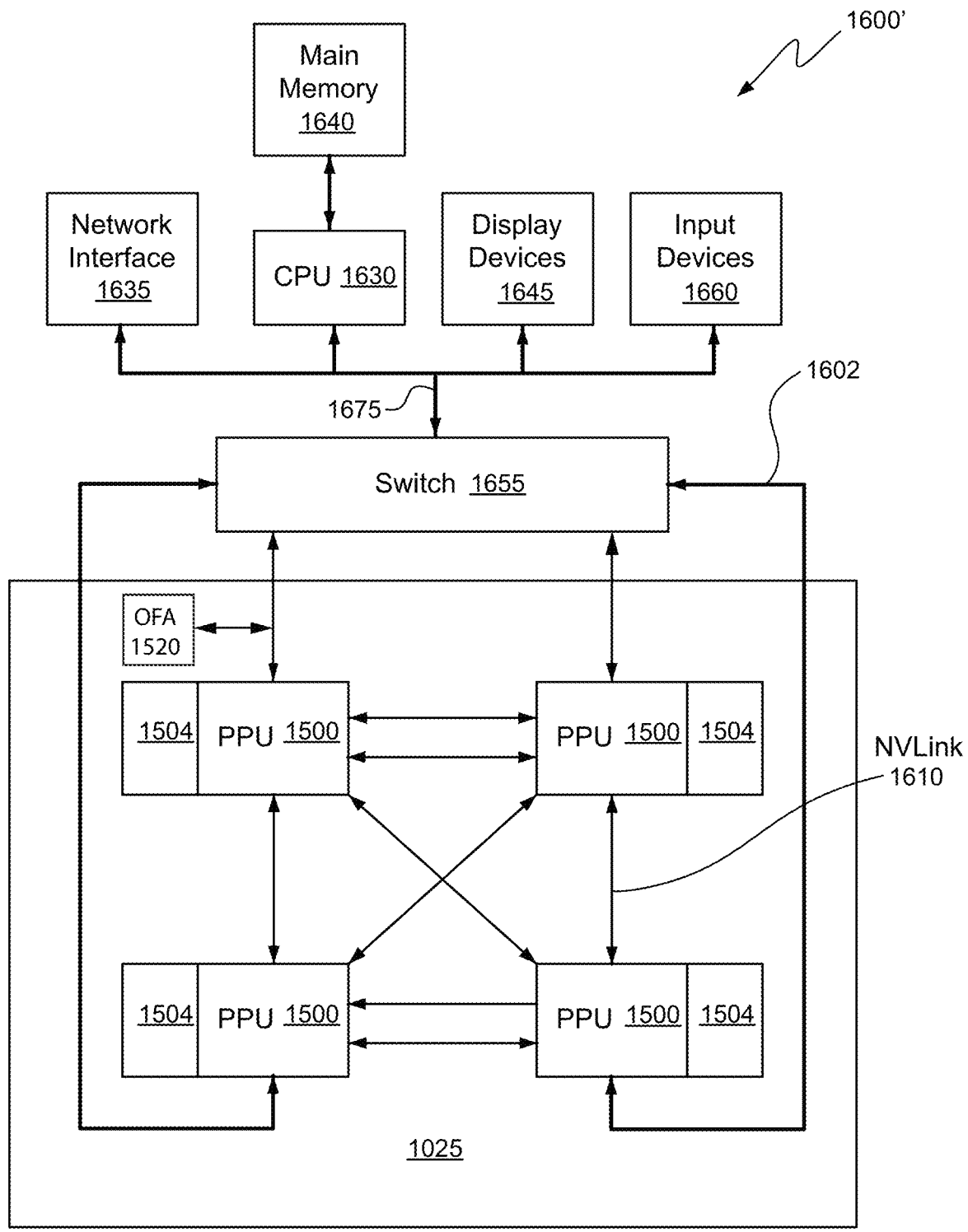
FIG. 16B illustrates an exemplary system in which the various architecture and/or functionality of the various previous embodiments may be implemented.

In an embodiment, the signaling rate of each NVLink 1510 is 20 to 25 Gigabits/second and each PPU 1500 includes six NVLink 1510 interfaces (as shown in FIGS. 16A-B, five NVLink 1610 interfaces are included for each PPU 1500). Each NVLink 1510 provides a data transfer rate of 25 Gigabytes/second in each direction, with six links providing 300 Gigabytes/second. The NVLinks 1510 can be used exclusively for PPU-to-PPU communication as shown in FIGS. 16A-B, or some combination of PPU-to-PPU and PPU-to-CPU, when the CPU 1630 also includes one or more NVLink 1510 interfaces.

In an embodiment, the NVLink 1510 allows direct load/store/atomic access from the CPU 1630 to each PPU's 1500 memory 1504. In an embodiment, the NVLink 1510 supports coherency operations, allowing data read from the memories 1504 to be stored in the cache hierarchy of the CPU 1630, reducing cache access latency for the CPU 1630. In an embodiment, the NVLink 1510 includes support for Address Translation Services (ATS), allowing the PPU 1500 to directly access page tables within the CPU 1630. One or more of the NVLinks 1510 may also be configured to operate in a low-power mode.

FIG. 16B illustrates an exemplary system 1600' in which the various architecture and/or functionality of the various previous embodiments may be implemented. System 1600' is provided including at least one central processing unit 1630 that is connected to a communication bus 1675. The communication bus 1675 may be implemented using any suitable protocol, such as PCI (Peripheral Component Interconnect), PCI-Express, AGP (Accelerated Graphics Port), HyperTransport, or any other bus or point-to-point communication protocol(s). The system 1600' also includes a main memory 1640. Control logic (software) and data are stored in the main memory 1640 which may take the form of random access memory (RAM).

The system 1600' also includes input devices 1660, the parallel processing system 1625, and display devices 1645, e.g. a conventional CRT (cathode ray tube), LCD (liquid crystal display), LED (light emitting diode), plasma display or the like. User input may be received from the input devices 1660, e.g., keyboard, mouse, touchpad, microphone, and the like. Each of the foregoing modules and/or devices may even be situated on a single semiconductor platform to form the system 1600'. Alternately, the various modules may also be situated separately or in various combinations of semiconductor platforms per the desires of the user.

Further, the system 1600' may be coupled to a network (e.g., a telecommunications network, local area network (LAN), wireless network, wide area network (WAN) such as the Internet, peer-to-peer network, cable network, or the like) through a network interface 1635 for communication purposes.

The system 1600' may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1640 and/or the secondary storage. Such computer programs, when executed, enable the system 1600' to perform various functions. The memory 1640, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 1600' may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

Various programs may be executed within the PPU 1500 in order to implement the various stages of a graphics processing pipeline. For example, the device driver may launch a kernel on the PPU 1500 to perform the vertex shading stage on one SM (or multiple SMs). The device driver (or the initial kernel executed by the PPU 1500) may also launch other kernels on the PPU 1500 to perform other stages of the graphics processing pipeline, such as the geometry shading stage and the fragment shading stage. In addition, some of the stages of a graphics processing pipeline may be implemented on fixed unit hardware such as a rasterizer or a data assembler implemented within the PPU 1500. It will be appreciated that results from one kernel may be processed by one or more intervening fixed function hardware units before being processed by a subsequent kernel on an SM.

Machine Learning

Deep neural networks (DNNs) developed on processors, such as the PPU 1500 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 1500. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 1500 is a computing platform capable of delivering performance required for deep neural network-based artificial intelligence and machine learning applications.

Example Technical Advantages of Some Embodiments

Certain example embodiments provide for real-time optical flow determination for input video streams using a hardware-based optical flow accelerator referred to herein as "OFA". Hardware-based acceleration of optical flow and stereo disparity determination provide high levels of accuracy in real-time. The hardware-based acceleration enables the output optical flow to employ separate optical flow generation techniques for background and foreground, respectively, in order to improve the level of accuracy. The combining of the outputs from different optical flow techniques for background and foreground is facilitated by using the same technique (e.g. SGM) as the core regularizer for the different optical flow techniques.

Various configurable options provide for biasing the hardware optical flow accelerator to quality or performance, so that it may be customized for the requirements of particular environments.

By providing optical flow and stereo disparity on the same chip, the OFA is capable of handling a wide variety of applications including generating optical flow and/or stereo disparity for autonomous driving or ADAS, for deep learning, video stitching, etc.

The OFA enables high performance by allowing for the use of the lowest necessary input and output resolutions, for the use of the most appropriate operation mode (e.g. general optical flow mode, static world optical flow, and fusion optical flow), for the use of the region of interest (ROI) mode, and for the use of additional performance tuning.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Numerous modifications and variations of the present invention are possible in light of the above teachings. It is therefore to be understood that within the scope of the appended claims, the invention may be practiced otherwise than as specifically described herein.

What is claimed is:

1. A system, comprising:
   at least one processor configured to receive a first image, a second image, and camera position information for the first image and the second image, and to form a first collection of images of respectively different resolutions of the first image and a second collection of images of respectively different resolutions of the second image; and
   optical flow acceleration circuitry coupled to the at least one processor and comprising (1) a first optical flow generation hardware pipeline configured to take as input the first collection of images and the second collection of images and (2) a second optical flow generation hardware pipeline configured to take as input the first image, the second image and the camera position information, the optical flow acceleration circuitry configured to:
      receive, in the first optical flow generation hardware pipeline, the first collection of images and the second collection of images, and determine, using the first optical flow generation hardware pipeline, a first optical flow associated with the first image and the second image, wherein the first optical flow is determined using a first disparity search technique that is based on a motion estimation using the first collection of images and the second collection of images; and
      receive, in the second optical flow generation hardware pipeline, the camera position information, and determine, using the second optical flow generation hardware pipeline, a second optical flow associated with the first image and the second image, wherein the second optical flow is determined using a second disparity search technique that is based on motion estimation using the first image, the second image and the camera position information; and
   the at least one processor is further configured to obtain the first optical flow determined using the first optical flow generation hardware pipeline and the second optical flow determined using the second optical flow generation hardware pipeline and to combine the first optical flow and the second optical flow to generate a third optical flow associated with the first and second images.

2. The system according to claim 1, wherein the first disparity search technique is dependent on said camera position information, and the second disparity search technique is independent of said camera position information.

3. The system according to claim 1, wherein the second disparity search technique in the second optical flow generation hardware pipeline includes searching along epipolar lines in respective input images, and the first disparity search technique in the first optical flow generation hardware pipeline includes searching in a rectangular area in respective images of said collections of images.

4. The system according to claim 3, wherein the optical flow circuitry is further configured to determine the first optical flow in the first optical flow generation hardware pipeline and the second optical flow in the second optical flow generation hardware pipeline using a same core regularizer technique for smoothing pixel matching costs, wherein a common circuitry connected to the first optical flow generation hardware pipeline and the second optical flow generation hardware pipeline is configured to perform the core regularizer technique.

5. The system according to claim 4, wherein the core regularizer technique is based on Semi-Global Matching (SGM).

6. The system according to claim 1, wherein the first optical flow generation hardware pipeline, the second optical flow generation hardware pipeline and the at least one processor are formed as a system-on-a-chip (SoC).

7. The system according to claim 1, wherein the at least one processor is configured to generate the third optical flow by selectively combining background in the input images using the first optical flow output from the first optical flow generation hardware pipeline and foreground in the input images using the second optical flow output from the second optical flow generation hardware pipeline.

8. The system according to claim 1, wherein the optical flow accelerator circuitry is further configured to determine a stereo disparity map associated with the input images.

9. The system according to claim 1, wherein the second disparity search technique includes searching in a rectangular area, and wherein the second disparity search technique further includes searching respective layers of a Gaussian Pyramid of comprising said collections of images.

10. The system according to claim 9, wherein the optical flow circuitry is further configured to use a motion vector hint in the second disparity search technique.

11. The system according to claim 1, wherein disparity measurements for the first disparity search technique are based on one dimensional disparities measured along epipolar lines and disparity measurements for the second disparity search technique are based upon two dimensional disparities based upon a cost volume generated by the optical flow acceleration circuitry, each element in the generated cost volume being a disparity in two dimensional space.

12. The system according to claim 1, wherein the input images are images output by a graphics processing unit (GPU).

13. The system according to claim 1, wherein the processor is further configured to use the generated third optical flow in at least one of object detection, tracking structure from motion (SFM) and/or SLAM in an automotive application, video stitching in a virtual reality application, framerate up-conversion in a gaming application, and video classification in a deep learning application.

14. The system according to claim 1, wherein the optical flow acceleration circuitry is further configured to perform the first disparity search and the second disparity search based on a Semi-Global Matching (SGM) algorithm.

15. The system according to claim 14, wherein a number of passes of the SGM algorithm is configurable.

16. The system according to claim 15, wherein a first smoothing penalty term and a second smoothing penalty term used in calculating path costs in the SGM algorithm are configurable.

17. The system according to claim 15, wherein the optical flow accelerator is configured for at least one of: enabling and disabling equiangular subpixel refinement; supporting a subframe mode to reduce output latency; supporting enabling and disabling cost map output; supporting enabling and disabling diagonal path in path cost aggregations according to the SGM algorithm.

18. The system according to claim 15, wherein the processor is configured to initiate the optical flow accelerator circuitry for each of a plurality of regions of interest (ROI) in an input image.

19. The system according to claim 15, wherein the processor is configured to initiate the optical flow accelerator circuitry for each of a plurality of subframes of an input frame.

20. The system according to claim 1, wherein the optical flow circuitry is further configured to access an off-chip memory during said first disparity search or said second disparity search, the off-chip memory including intermediate buffers to store intermediate results from previous disparity search pass and history buffer for storing path costs for preceding pixels.

21. The system according to claim 1, wherein the optical flow circuitry includes a configurable quality versus performance bias parameter to variably control a size of motion vector and/or disparity map output granularity, wherein the variable control is based upon a configurable grid size used in the second disparity search.

22. The system according to claim 21, wherein the configurable grid size controls a selection of pixels to be processed in the input images.

23. The system according to claim 21, wherein the grid size is configurable independently in the x-direction and the y-direction.

24. A method of accelerated optical flow generation, the method comprising:
receiving, by at least one processor, a first image, a second image, and camera position information for the first image and the second image, and forming, by the at least one processor, a first collection of images of respectively different resolutions of the first image and a second collection of images of respectively different resolutions of the second image;
receiving, by a first optical flow generation hardware pipeline in an optical flow acceleration circuitry, the first collection of images and the second collection of images, and determining, by a first optical flow generation hardware pipeline, a first optical flow associated with the first image and the second image, wherein the first optical flow is determined using a first disparity search that is based on a motion estimation using the first and second collections of images;
receiving, by a second optical flow generation hardware pipeline in the optical flow acceleration circuitry, the camera position information, and determining, by the second optical flow generation hardware pipeline, a second optical flow associated with the first image and the second image, wherein the second optical flow is determined using a second disparity search that is based on motion estimation using the first image, the second image and the camera position information; and
combining, by the at least one processor coupled to the optical flow acceleration circuitry, the first optical flow from the first optical flow generation hardware pipeline and the second optical flow from the second optical flow generation hardware pipeline to generate a third optical flow associated with the first and second images.

* * * * *